US009670819B2

(12) United States Patent
Aoki et al.

(10) Patent No.: US 9,670,819 B2
(45) Date of Patent: Jun. 6, 2017

(54) CATALYST DETERIORATION DETERMINATION SYSTEM

(75) Inventors: Keiichiro Aoki, Shizuoka-ken (JP); Koichi Kitaura, Odawara (JP); Go Hayashita, Susono (JP)

(73) Assignee: Toyota Jidosha Kabushiki Kaisha, Toyota-shi, Aichi (JP)

( * ) Notice: Subject to any disclaimer, the term of this patent is extended or adjusted under 35 U.S.C. 154(b) by 266 days.

(21) Appl. No.: 14/404,340

(22) PCT Filed: May 28, 2012

(86) PCT No.: PCT/JP2012/063654
§ 371 (c)(1),
(2), (4) Date: Nov. 26, 2014

(87) PCT Pub. No.: WO2013/179373
PCT Pub. Date: Dec. 5, 2013

(65) Prior Publication Data

US 2015/0152769 A1 Jun. 4, 2015

(51) Int. Cl.

| | |
|---|---|
| ***F01N 3/00*** | (2006.01) |
| ***F01N 11/00*** | (2006.01) |
| ***F02D 41/02*** | (2006.01) |
| ***G01M 15/10*** | (2006.01) |
| *F02D 41/14* | (2006.01) |

(52) U.S. Cl.
CPC ........ *F01N 11/007* (2013.01); *F02D 41/0235* (2013.01); *F02D 41/1454* (2013.01); *G01M 15/104* (2013.01); *F01N 2550/02* (2013.01); *F01N 2560/025* (2013.01);
(Continued)

(58) Field of Classification Search
USPC .......................... 60/274, 276, 277, 285, 286
See application file for complete search history.

(56) References Cited

U.S. PATENT DOCUMENTS 5,414,996 A 5/1995 Sawada et al.
8,534,046 B2 * 9/2013 Miyamoto ............. F01N 11/00 60/274

(Continued)

FOREIGN PATENT DOCUMENTS

EP 0972927 A2 1/2000
JP 63-195351 8/1988

(Continued)

*Primary Examiner* — Binh Q Tran
(74) *Attorney, Agent, or Firm* — Finnegan, Henderson, Farabow, Garrett & Dunner, LLP

(57) ABSTRACT

A catalyst deterioration determination system determines deterioration of an exhaust gas purification catalyst on the basis of its oxygen storage capacity. The system includes a downstream oxygen concentration sensor having characteristics by which as rich gas components in exhaust gas increase, the oxygen concentration sensor outputs a measurement value of the oxygen concentration corresponding to a richer air-fuel ratio. The system performs a rich shift mode and a lean shift mode based on the measurement value of the oxygen concentration sensor. The rate of change of the exhaust gas air-fuel ratio in at least the lean shift mode is limited to a predetermined rate of change or lower, and the rate of change of the exhaust gas air-fuel ratio in the rich shift mode is set higher than the rate of change of the exhaust gas air fuel ratio in the lean shift mode.

7 Claims, 14 Drawing Sheets

(52) U.S. Cl.
CPC ...... *F02D 41/1441* (2013.01); *F02D 41/1456* (2013.01); *F02D 2200/0816* (2013.01); *Y02T 10/47* (2013.01)

(56) References Cited

U.S. PATENT DOCUMENTS

| | | | | |
|---|---|---|---|---|
| 8,683,856 | B2 * | 4/2014 | Kitaura | F01N 3/101 73/114.75 |
| 8,789,357 | B2 * | 7/2014 | Shinoda | F01N 3/10 60/274 |
| 8,899,015 | B2 * | 12/2014 | Sato | F01N 11/007 60/276 |
| 8,944,037 | B2 * | 2/2015 | Yonekawa | F02D 41/0295 123/672 |
| 2008/0295488 | A1 | 12/2008 | Takubo | |

FOREIGN PATENT DOCUMENTS

| | | |
|---|---|---|
| JP | 05-133264 | 5/1993 |
| JP | 2006-275007 | 10/2006 |
| JP | 2008-295044 | 12/2008 |
| JP | 2009-036172 | 2/2009 |
| JP | 2009-215924 | 9/2009 |

* cited by examiner 20
11
9
8
7
3
10
1
2
6
5
4

(a)

(b)

CATALYST DETERIORATION DETERMINATION SYSTEM

CROSS REFERENCE TO RELATED PATENT APPLICATION

This application is a national phase of International Application No. PCT/JP2012/063654, filed on May 28, 2012, which is incorporated herein by reference.

TECHNICAL FIELD

The present invention relates to a system for determining deterioration of an exhaust gas purification catalyst of an internal combustion engine.

BACKGROUND ART

An internal combustion engine typically has an exhaust gas purification catalyst provided in an exhaust passage to purify exhaust gas. Among such catalysts, a catalyst having a capability of storing oxygen, such as a three way catalyst, is capable of removing NOx and removing HC and CO by oxidation with release of oxygen stored in it. The exhaust gas purification catalyst having a capability of storing oxygen as described above is intended to remove NOx, HC, and CO at the same time by making the air-fuel ratio of the exhaust gas flowing into the catalyst richer than the theoretical air fuel ratio and leaner than the theoretical air fuel ratio alternately.

As an exhaust gas purification catalyst deteriorates, its exhaust gas purifying ability deteriorates. Therefore, as deterioration of the catalyst progresses to some extent, the catalyst needs maintenance such as replacement. For exhaust gas purification catalysts having a capability of storing oxygen like three-way catalysts, a technique of determining deterioration of a catalyst by detecting a decrease in its oxygen storage capacity (see, for example, patent literature 1). In this technique, the air-fuel ratio of the exhaust gas flowing into the exhaust gas purification catalyst is shifted from lean to rich and from rich to lean alternately on the basis of measurement values of an air-fuel ratio sensor provided downstream of the oxidation purification catalyst. The oxygen storage capacity of the exhaust gas purification catalyst is calculated based on the difference in the exhaust gas air-fuel ratio and the flow rate of the exhaust gas flowing through the exhaust gas purification catalyst in this process, and deterioration of the catalyst is determined based on the calculated oxygen storage capacity.

CITATION LIST

Patent Literature

Patent Literature 1: Japanese Patent Application Laid-Open No. H5-133264

Patent Literature 2: Japanese Patent Application Laid-Open No. 2009-215924

Patent Literature 3: Japanese Patent Application Laid-Open No. 2009-36172

Patent Literature 4: Japanese Patent Application Laid-Open No. 2008-298044

Patent Literature 5: Japanese Patent Application Laid-Open No. S63-195351

SUMMARY OF THE INVENTION

Problems to be Solved by the Invention

To determine deterioration of an exhaust gas purification catalyst having a capability of storing oxygen, there has been employed hitherto the Cmax method in which the air-fuel ratio of the exhaust gas flowing into the exhaust gas purification catalyst is shifted by a control (which will be hereinafter referred to as "active air-fuel ratio control") from lean to rich and from rich to lean alternately, and the oxygen storage capacity of the exhaust gas purification catalyst is calculated based on the change with time of the exhaust gas air-fuel ratio during this control. In this active air-fuel ratio control, it is preferred that the above-described shifting of the exhaust gas air-fuel ratio is switched at the time when the oxygen storage limit of the exhaust gas purification catalyst is reached and at the time when the oxygen release limit of the exhaust gas purification catalyst is reached. For this purpose, a sensor for measuring the exhaust gas air-fuel ratio or the oxygen concentration in the exhaust gas is typically provided downstream of the exhaust gas purification catalyst.

In the case where an oxygen concentration sensor is provided downstream of the exhaust gas purification catalyst in order to calculate the oxygen storage capacity of the exhaust gas purification catalyst using the Cmax method, the output of the oxygen concentration sensor deviates from the actual air-fuel ratio of the atmosphere around the sensor in some cases, possibly leading to an error in the timing of switching the shifting mode in the active air-fuel ratio control. The oxygen concentration sensor is likely to be affected by the behavior of hydrogen molecules in the neighborhood of electrodes for sensing and by the presence of rich gas components such as HC. In consequence, if the concentration of the rich gas components in the atmosphere increases, the output of the oxygen concentration sensor shows "overly rich output characteristics", namely the output shifts to overly richer values. This makes it difficult to perform the active air-fuel ratio control accurately and can affect accurate determination of deterioration of the exhaust gas purification catalyst.

Nowadays, it is a trend to reduce the amount of precious metals such as Pt used in exhaust gas purification catalysts. This leads to a decrease in the oxygen storage capacity that the exhaust gas purification catalysts intrinsically have, and the difference between the oxygen storage capacity of an exhaust gas purification catalyst in a deteriorated condition and the oxygen storage capacity of a normal exhaust gas purification catalyst has become smaller. In consequence, it is difficult to determine deterioration of an exhaust gas purification catalyst accurately.

The present invention has been made in view of the above-descried circumstances, and its object is to provide a catalyst deterioration determination system that can determine deterioration of an exhaust gas purification catalyst having a capability of storing oxygen with improved accuracy.

Means for Solving the Problems

In the present invention, to solve the above-described problem, when active air-fuel ratio control is performed to determine deterioration of an exhaust gas purification catalyst having a capability of storing oxygen, the rate of change of the air-fuel ratio of the exhaust gas flowing into the exhaust gas purification catalyst is limited to a predetermined rate of change or lower. If the rate of change of the exhaust gas air-fuel ratio is limited, the exhaust gas air-fuel ratio changes gradually, whereby a sufficient time for oxygen storing reaction and oxygen releasing reaction in the exhaust gas purification catalyst can be provided, and the atmosphere around an oxygen concentration sensor provided downstream of the exhaust gas purification catalyst can be improved. In consequence, the influence of overly rich output characteristics of the oxygen concentration sensor in determining deterioration of the exhaust gas purification catalyst can be reduced.

Specifically, the present invention provides a catalyst deterioration determination system for determining deterioration of an exhaust gas purification catalyst having a capability of storing oxygen provided in an exhaust passage of an internal combustion engine, comprising: exhaust gas air-fuel ratio control unit for controlling the air-fuel ratio of exhaust gas flowing into said exhaust gas purification catalyst; an oxygen concentration sensor that measures the oxygen concentration in exhaust gas flowing out of said exhaust gas purification catalyst and has specific measuring characteristics by which as a rich gas component in exhaust gas increases, said oxygen concentration sensor outputs a measurement value of the oxygen concentration corresponding to a richer air-fuel ratio; air-fuel ratio shifting unit that makes switching between a rich shift mode in which the exhaust gas air-fuel ratio is shifted from a lean air-fuel ratio to a rich air-fuel ratio by said exhaust gas air-fuel ratio control unit and a lean shift mode in which the exhaust gas air-fuel ratio is shifted from a rich air-fuel ratio to a lean air-fuel ratio by said exhaust gas air-fuel ratio control unit, based on the oxygen concentration in the exhaust gas measured by the oxygen concentration sensor, the rate of change of the exhaust gas air-fuel ratio in at least the lean shift mode among the rich shift mode and the lean shift mode being limited to a predetermined rate of change or lower, and the rate of change of the exhaust gas air-fuel ratio in the rich shift mode being set higher than the rate of change of the exhaust gas air-fuel ratio in the lean shift mode; and deterioration determination unit for determining deterioration of said exhaust gas purification catalyst based on the oxygen storage capacity of said exhaust gas purification catalyst during a time in which said rich shift mode is performed by said air-fuel ratio shifting unit and the oxygen storage capacity of said exhaust gas purification catalyst during a time in which said lean shift mode is performed by said air-fuel ratio shifting unit.

The catalyst deterioration determination system according to the present invention determines deterioration of an exhaust gas purification catalyst that purifies exhaust gas flowing in an exhaust passage of an internal combustion engine and is capable of storing oxygen. An example of the exhaust gas purification catalyst capable of storing oxygen is a three-way catalyst. The three-way catalyst stores oxygen in the exhaust gas flowing into it when the air-fuel ratio of the exhaust gas is lean and releases oxygen stored in it when the air-fuel ratio of the exhaust gas is rich. Therefore, it can remove NOx, HC, and CO in the exhaust gas when the air-fuel ratio of the exhaust gas flowing into it is in the neighborhood of the stoichiometry.

In the above-described catalyst deterioration determination system, the oxygen storage capacity of the exhaust gas purification catalyst is calculated using a method developed by improving the conventional Cmax method (which will be hereinafter referred to as the "improved Cmax method"). The improved Cmax method reduces the influence of the above-described specific characteristics or the overly rich output characteristics of the oxygen concentration sensor used to determine switching of the shift mode in the active air-fuel ratio control. Specifically, at least in the lean shift mode, among the rich shift mode and the lean shift mode performed by the air-fuel ratio shift unit in the active air-fuel ratio control, the rate of change of the air-fuel ratio of the exhaust gas flowing into the exhaust gas purification catalyst is limited to a predetermined rate of change so that the air-fuel ratio of the exhaust gas changes slowly (or shifts to a target lean air-fuel ratio slowly).

In the lean shift mode as originally intended, rich gas components flow out of the exhaust gas purification catalyst in an early stage of the process of shift of the air-fuel ratio of the exhaust gas flowing into the exhaust gas purification catalyst from rich to lean. As oxygen in the exhaust gas is gradually stored in the exhaust gas purification catalyst, the storage of oxygen in the exhaust gas purification catalyst eventually reaches the maximum limit, and then lean gas components (or exhaust gas with a high oxygen concentration) start to flow out of the exhaust gas purification catalyst. In the active air-fuel ratio control performed by the conventional Cmax method, the air-fuel ratio of the exhaust gas flowing into the exhaust gas purification catalyst is changed (increased) abruptly in a step manner. Therefore, it is difficult for the oxygen storing reaction in the exhaust gas purification catalyst to progress sufficiently, and rich gas components and lean gas components flow out in a mixed manner in the exhaust gas, in some cases. In such cases, the oxygen concentration sensor provided downstream of the exhaust gas purification catalyst is affected by the above-described specific characteristics to output a value richer than the actual air-fuel ratio of the exhaust gas to prevent switching of the shift mode in the Cmax method from being performed appropriately.

In the deterioration determination system according to the present invention, in the lean shift mode, the rate of change of the air-fuel ratio flowing into the exhaust gas purification catalyst is limited to a predetermined rate of change or lower by the air-fuel ratio shift unit, and the change is gradual. Therefore. the exhaust gas purification catalyst can store oxygen reliably. Consequently, the rich gas components and the lean gas components start to flow out in the exhaust gas flowing out of the exhaust gas purification catalyst or the exhaust gas to which the oxygen concentration sensor is exposed for measurement at originally intended timing, namely timing that is not likely to lead to the mixed outflowing of both the rich and lean gas components. In consequence, the improved Cmax method according to the present invention enables calculation of the oxygen storage capacity of the exhaust gas purification catalyst with reduced influence of the above-described specific characteristics of the oxygen concentration sensor.

Therefore, the deterioration determination unit can determine deterioration of the exhaust gas purification catalyst based on its oxygen storage capacity with improved accuracy. The determination by the deterioration determination unit may be made by comparing an oxygen storage capacity calculated by the improved Cmax method and a reference oxygen storage capacity.

In the rich shift mode with the above-described air-fuel ratio shift unit also, the rate of change of the air-fuel ratio of the exhaust gas flowing into the exhaust gas purification catalyst may be limited to a predetermined rate of change so that the air-flow ratio of the exhaust gas changes slowly (or shifts to a target rich air-fuel ratio slowly). In the rich shift mode as originally intended, oxygen stored in the exhaust gas purification catalyst is released during the process of shift of the air-fuel ratio of the exhaust gas flowing into the exhaust gas purification catalyst from lean to rich, and therefore, the air-fuel ratio of the exhaust gas flowing out of the exhaust gas purification catalyst becomes leaner to an extent corresponding to the amount of released oxygen. In the active air-fuel ratio control performed by the conventional Cmax method, since the air-fuel ratio of the exhaust gas flowing into the exhaust gas purification catalyst is changed (or decreased) abruptly in a step manner, it is difficult for the oxygen releasing reaction in the exhaust gas purification catalyst to progress sufficiently, leading to insufficient release of oxygen in the rich shift mode and to an increase in the amount of rich gas components in the exhaust gas flowing out of the exhaust gas purification catalyst. In such cases, the oxygen concentration sensor provided downstream of the exhaust gas purification catalyst is affected by the above-described specific characteristics to output a value richer than the actual air-fuel ratio of the exhaust gas to prevent switching of the shift mode in the Cmax method from being performed appropriately.

However, if the air-fuel ratio shift unit limits the rate of change of the air-fuel ratio of the exhaust gas flowing into the exhaust gas purification catalyst to a predetermined rate of change or lower in the rich shift mode also, the change is gradual. Therefore, the exhaust gas purification catalyst can release oxygen reliably. Therefore, unwanted increase in the amount of rich gas components in the exhaust gas flowing out of the exhaust gas purification catalyst or the exhaust gas to which the oxygen concentration sensor is exposed for sensing can be prevented from occurring. In consequence, the improved Cmax method according to the present invention enables calculation of the oxygen storage capacity of the exhaust purification catalyst with reduced influence of the above-described specific characteristics of the oxygen concentration sensor.

Moreover, with the above-described air-fuel ratio shift unit, the rate of change of the exhaust gas air-fuel ratio in the rich shift mode is set larger than the rate of change of the exhaust gas air-fuel ratio in the lean shift mode. In consequence, the time taken for the air-fuel ratio of the exhaust gas flowing into the exhaust gas purification catalyst to reach the target rich air-fuel ratio in the rich shift mode is shorter, and the time taken for the air-fuel ratio of the exhaust gas flowing into the exhaust gas purification catalyst to reach the target lean air-fuel ratio in the lean shift mode is longer. When the air-fuel ratio of the exhaust gas flowing into the exhaust gas purification catalyst changes from the stoichiometry to a rich air-fuel ratio, the amount of NOx emitted from the exhaust gas purification catalyst increases. Shifting the air-fuel ratio quickly in the rich shift mode as described above can reduce the amount of NOx emitted thereby.

It is preferred that the predetermined rate of change set as the upper limit of the rate of change of the exhaust gas air-fuel ratio in the lean shift mode and the rich shift mode be determined in such a way that an appropriate reaction time for oxygen storage and oxygen release in the exhaust gas purification catalyst is ensured.

In the above-described catalyst deterioration determination system, the air-fuel ratio shift unit may control the exhaust gas air-fuel ratio by said exhaust gas air-fuel ratio control unit in such a way that the rate of change of said exhaust gas air-fuel ratio is limited to said predetermined rate of change or lower in both of said lean shift mode and said rich shift mode. In other words, in both the shift modes in the active air-fuel ratio control, the air-fuel ratio of the exhaust gas is controlled in such a way that the air-fuel ratio of the exhaust gas flowing into the exhaust gas purification catalyst changes gradually.

In the catalyst deterioration determination system according to the present invention, the above-described mode in which the exhaust gas air-fuel ratio is changed gradually in both of the shift modes may be replaced by the following mode: in said lean shift mode, said air-fuel ratio shift unit controls the exhaust gas air-fuel ratio by said exhaust gas air-fuel ratio control unit in such a way that the rate of change of said exhaust gas air-fuel ratio is limited to said predetermined rate of change or lower, and in said rich shift mode, said air-fuel ratio shift unit controls the exhaust gas air-fuel ratio by said exhaust gas air-fuel ratio control unit in such a way as to make said exhaust gas air-fuel ratio equal to a predetermined rich air-fuel ratio as a target to be reached in said rich shift mode immediately after switching from said lean shift mode to said rich shift mode. Thus, in the active control, while in the lean shift mode the air-fuel ratio of the exhaust gas flowing into the exhaust gas purification catalyst is changed gradually, in the rich shift mode the air-fuel ratio of the exhaust gas is controlled in such a way as to make the air-fuel ratio of the exhaust gas flowing into the exhaust gas purification catalyst equal to the predetermined rich air fuel ratio immediately.

Therefore, in the rich shift mode, the air fuel ratio of the exhaust gas is controlled in such a way that the air-fuel ratio of the exhaust gas flowing into the exhaust gas purification catalyst changes in a step manner immediately after switching of the shift mode. By this control, the exhaust gas air-fuel ratio in the interior of the exhaust gas purification catalyst can be made rich by a relatively large degree particularly in the rich shift mode, the progress of S-poisoning of the exhaust gas purification catalyst can be suppressed or removal of S-poisoning can be promoted, and improvement in emission control can be expected. Since it is possible to control the S-poisoned condition of the exhaust gas purification catalyst at least temporarily, the oxygen storage capability of the exhaust gas purification catalyst is maintained, leading to a reduction in the probability of the exposure of the oxygen concentration sensor to exhaust gas containing a large amount of rich gas components.

In the above-described catalyst deterioration determination system, in a predetermined period from a time immediately after switching from said rich shift mode to said lean shift mode until said exhaust gas air-fuel ratio reaches an air fuel ratio near the stoichiometry in a period in which said lean shift mode is performed, said air-fuel ratio shift unit may control the exhaust gas air-fuel ratio by said exhaust gas air-fuel ratio control unit in such a way that the rate of change of said exhaust gas air-fuel ratio is limited to said predetermined rate of change or lower, and after the end of said predetermined period in said lean shift mode, said air-fuel ratio shift unit may control the exhaust gas air-fuel ratio by said exhaust gas air-fuel ratio control unit in such a way as to make said exhaust gas air-fuel ratio equal to a predetermined lean air-fuel ratio as a target to be reached in said lean shift mode immediately after the end of said predetermined period. Thus, in the first process from switching to the lean shift mode until the exhaust gas air-fuel ratio reaches a air-fuel ratio near the stoichiometry, the air-fuel ratio of the exhaust gas flowing into the exhaust gas purification catalyst is gradually changed, and in the subsequent process, the exhaust gas air-fuel ratio is changed in a step manner, so that the exhaust gas air-fuel ratio is changed as quick as possible.

If the above method is employed, the time taken to make the air-fuel ratio of the exhaust gas flowing into the exhaust gas purification catalyst lean can be made as short as possible in the lean shift mode also. Therefore, the amount of NOx generated in the internal combustion engine in particular can be reduced.

In the catalyst deterioration determination system described in the foregoing, said predetermined rate of change may be set based on the response speed of a rich gas component and a lean gas component in the exhaust gas in said oxygen concentration sensor. With this feature, the difference between the change with time of the air-fuel ratio of the exhaust gas flowing into the exhaust gas purification catalyst and the change with time of the output of the oxygen concentration sensor used to control the change of the exhaust gas air fuel ratio can be reduced, and it is possible to calculate the oxygen storage capacity of the exhaust gas purification catalyst with improved accuracy.

The catalyst deterioration determination system described in the foregoing may further include correction unit for correcting said predetermined rate of change in such a way as to make it larger as the temperature of said oxygen concentration sensor rises. As the temperature of the oxygen concentration sensor rises, its sensitivity increases, and it can measure the oxygen concentration with high accuracy even if the rate of change of the air-fuel ratio of the exhaust gas flowing into the exhaust gas purification catalyst becomes high. Therefore, if the system has the above-described correction unit, the rate of change of the exhaust gas air-fuel ratio in the active air-fuel ratio control can be set to an appropriate value, and therefore it is possible to calculate the oxygen storage capacity of the exhaust gas purification catalyst accurately.

The catalyst deterioration determination system described in the foregoing may further include correction unit for correcting said predetermined rate of change in such a way as to make it smaller as the flow rate of exhaust gas flowing into said exhaust gas purification catalyst increases. When the exhaust gas flow rate is high, the oxygen storing reaction and the oxygen releasing reaction in the exhaust gas purification catalyst do not progress sufficiently in some cases. In such cases, the rate of change of the exhaust gas air-fuel ratio in the active air-fuel ratio control may be made smaller, whereby the oxygen concentration can be measured by the oxygen concentration sensor with appropriate measurement accuracy. Therefore, the value of the rate of change of the exhaust gas air-fuel ratio in the active air-fuel ratio control can be made appropriate by the aforementioned correction unit, and it is possible to calculate the oxygen storage capacity of the exhaust gas purification catalyst accurately.

The catalyst deterioration determination system according to the present invention may be configured as follows in a way different from the system described in the foregoing. According to the present invention, a catalyst deterioration determination system for determining deterioration of an exhaust gas purification catalyst having a capability of storing oxygen provided in an exhaust passage of an internal combustion engine, comprises: exhaust gas air-fuel ratio control unit for controlling the air-fuel ratio of exhaust gas flowing into said exhaust gas purification catalyst; an oxygen concentration sensor that measures the oxygen concentration in exhaust gas flowing out of said exhaust gas purification catalyst and has specific measuring characteristics by which as a rich gas component in exhaust gas increases, said oxygen concentration sensor outputs a measurement value of the oxygen concentration corresponding to a richer air-fuel ratio; air-fuel ratio shifting unit that makes switching between a rich shift mode in which the exhaust gas air-fuel ratio is shifted from a lean air-fuel ratio to a rich air-fuel ratio by said exhaust gas air-fuel ratio control unit and a lean shift mode in which the exhaust gas air-fuel ratio is shifted from a rich air-fuel ratio to a lean air-fuel ratio by said exhaust gas air-fuel ratio control unit, based on the oxygen concentration in the exhaust gas measured by the oxygen concentration sensor, the rate of change of the exhaust gas air-fuel ratio in the rich shift mode and the rate of change of the exhaust gas air-fuel ratio in the lean shift mode being limited to a predetermined rate of change or lower; and deterioration determination unit for determining deterioration of said exhaust gas purification catalyst based on the oxygen storage capacity of said exhaust gas purification catalyst during a time in which said rich shift mode is performed by said air-fuel ratio shifting unit and the oxygen storage capacity of said exhaust gas purification catalyst during a time in which said lean shift mode is performed by said air-fuel ratio shifting unit.

In the case of the system according to the present invention configured as above also, the exhaust gas purification catalyst can store and release oxygen reliably in the rich shift mode and in the lean shift mode, as with in the system according to the present invention described above. Therefore, it is possible to calculate the oxygen storage capacity of the exhaust gas purification catalyst with reduced influence of the aforementioned specific characteristics of the oxygen concentration sensor. Moreover, the features described in the foregoing in connection with the above-described mode of the present invention may be applied to this mode of the present invention, if feasible without any technical contradiction.

Advantageous Effect of the Invention

There is provided a catalyst deterioration determination system that can determine deterioration of an exhaust gas purification catalyst having a capability of storing oxygen with improved accuracy.

EMBODIMENTS FOR CARRYING OUT THE INVENTION

In the following, specific embodiments of the present invention will be described with reference to the drawings. The dimensions, materials, shapes, relative arrangements, and other features of the components that will be described in connection with the embodiments are not intended to limit the technical scope of the present invention only to them, unless particularly stated.

Embodiment 1

Figure 1:
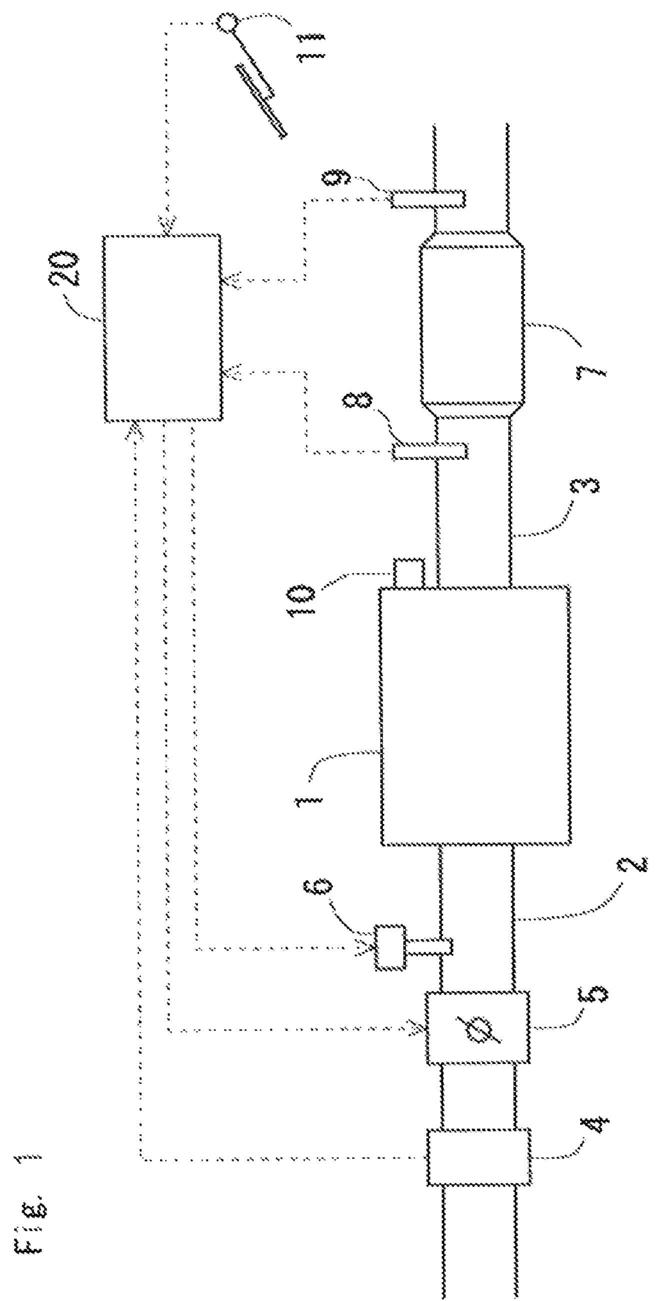
FIG. 1 is a diagram showing the general configuration of a system for determining deterioration of a catalyst provided in an exhaust passage of an internal combustion engine according to the present invention.

FIG. 1 is a diagram showing the general configuration of a catalyst deterioration determination system according to an embodiment. The internal combustion engine shown in FIG. 1 is a spark-ignition internal combustion engine having a fuel injection valve 6 that injects fuel and an ignition plug (not shown). In an intake passage 2 of the internal combustion engine 1, there are arranged, in order from upstream, an air flow meter 4 that measures the intake air quantity and an electronically-controlled throttle valve 5. The aforementioned fuel injection valve 6 is arranged downstream of the throttle valve 5. In an exhaust passage 3 of the internal combustion engine 1, there is provided a three-way catalyst 7 having a capability of storing oxygen. An air-fuel ratio sensor 8 for measuring the air-fuel ratio of the exhaust gas flowing into the three-way catalyst 7 is provided upstream of the three-way catalyst 7. An oxygen concentration sensor 9 for measuring the concentration of oxygen contained in the exhaust gas flowing out of the three-way catalyst 7 is provided downstream of the three-way catalyst 7. The air-fuel ratio sensor 8 used is what is called a wide range air-fuel ratio sensor, which can measure the air-fuel ratio over a relatively wide range continuously and outputs signals having values proportional to the exhaust gas air-fuel ratios in the measurement range. On the other hand, the oxygen concentration sensor 9 has characteristics (Z-characteristics) by which its output value changes abruptly at the theoretical air-fuel ratio (in the neighborhood of the stoichiometry). Details of the characteristics of the oxygen concentration sensor 9 will be described later.

The catalyst deterioration determination system shown in FIG. 1 has an electronic control unit (which will be hereinafter referred to as the "ECU") 20 that controls components relevant to the internal combustion engine 1, such as the aforementioned throttle valve 5 and the fuel injection valve 6. The ECU 20 includes a CPU, ROM, RAM, input/output ports, and memory device etc., none of which are shown in the drawings. As shown in the drawing, the ECU 20 is electrically connected with the air flow meter 4, the throttle valve 5, the fuel injection valve 6, the ignition plug not shown in the drawing, the air-fuel ratio sensor 8, the oxygen concentration sensor 9, a crank angle sensor 10 that senses the crank angle of the internal combustion engine 1, an accelerator opening degree sensor 11 that senses the accelerator opening degree, and other various sensors. The ECU 20 controls the ignition plug, the throttle valve 5, and the fuel injection valve 6 etc. based on measurement values of the sensors so that a desired output is achieved and controls the ignition timing, the fuel injection quantity, the fuel injection timing, and the throttle valve opening degree etc.

The three-way catalyst 7 removes NOx, HC, and CO at the same time when the air-fuel ratio of the exhaust gas flowing into it is equal to the theoretical air-fuel ratio (of stoichiometric air fuel ratio: e.g. A/F=14.6). Therefore, when the internal combustion engine 1 is in normal operation, the ECU 20 feedback-controls the fuel injection quantity through the fuel injection valve 6 in such a way as to make the air-fuel ratio of the exhaust gas flowing into the three-way catalyst 7 nearly equal to the stoichiometric air-fuel ratio. Consequently, the air-fuel ratio of the exhaust gas flowing into the three-way catalyst 7 is kept within the neighborhood of the stoichiometry, so that the three-way catalyst 7 exercises the maximum exhaust gas purification performance.

Typically, the surface of the carrier substrate of the three-way catalyst 7 is coated with coating material, in which catalytic components constituted by precious metal particles such as Pt and Pd particles are held in a dispersed state. The coating material contains an oxygen storage component that can store and release oxygen in accordance with the air-fuel ratio of the atmospheric gas and serves as a promoter that promotes the reaction at the interface of the exhaust gas and the catalytic components. The oxygen storage component is made of cerium dioxide $CeO_2$ or zirconia. Thus, the three-way catalyst 7 stores oxygen in the exhaust gas and releases stored oxygen in accordance with the air-fuel ratio of the exhaust gas flowing into it. If the three-way catalyst 7 undergoes irreversible deterioration such as thermal deterioration, the exhaust gas purification performance is deteriorated due to a decrease in the efficiency of contact of the catalytic components and the exhaust gas, and amount of the coating material or the amount of oxygen storage components existing around the catalytic components decreases, leading to a decrease in the oxygen storage capability. In consequence, the degree of deterioration of the three-way catalyst 7 correlates with the degree of decrease in its oxygen storage capability. Therefore, it is possible to assess the degree of deterioration of the three-way catalyst 7 on the basis of the degree of oxygen storage capability (i.e. OSC: $O_2$ Storage Capacity) of the three-way catalyst 7.

Figure 2:
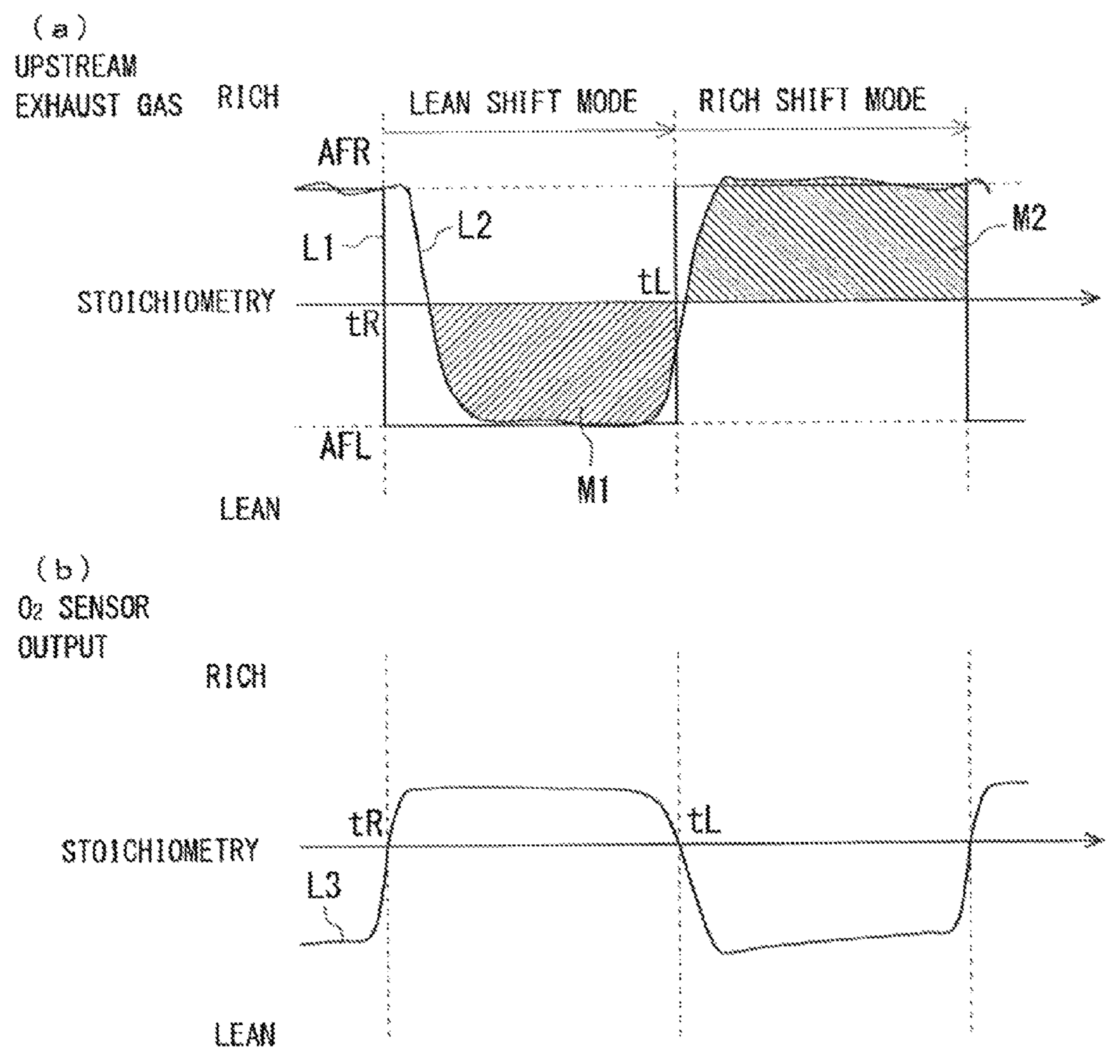
FIG. 2 shows a model of the Cmax method used to calculate the oxygen storage capacity (OSC) of the catalyst in the catalyst deterioration determination system shown in FIG. 1.

A method of calculating the OSC for the purpose of determining deterioration of the three-way catalyst 7 (this method will be hereinafter referred to as the "Cmax method") will be described with reference to FIG. 2, and a problem with the Cmax method, which was discovered by the applicant of the present patent application will be described with reference to FIGS. 3 to 6. The upper graph (a) in FIG. 2 shows the change with time of the air-fuel ratio of the exhaust gas flowing into the three-way catalyst 7. Specifically, curve L1 represents the change with time of a command (target air-fuel ratio) output by the ECU 20 pertaining to the air-fuel ratio of the exhaust gas flowing into the three-way catalyst 7, which is controlled by fuel injection through the fuel injection valve 6, and curve L2 represents the change with time of the air-fuel ratio of the exhaust gas actually flowing into the three-way catalyst 7, which is measured by the air-fuel ratio sensor 8. Curve L3 in the lower graph (b) in FIG. 2 represents the change with time of the output of the oxygen concentration sensor 9 provided downstream of the three-way catalyst 7. As described above, the oxygen concentration sensor 7 has characteristics by which its output value changes abruptly in the neighborhood of the stoichiometry of the exhaust gas air-fuel ratio.

In the Cmax method, when the output of the oxygen concentration sensor 9 shifts to the rich/lean output side, control for making the air-fuel ratio of the exhaust gas flowing into the three-way catalyst 7 equal to a predetermined lean/rich air-fuel ratio AFL/AFR is performed respectively, in the exemplary case shown in FIG. 2, the crossing of the stoichiometric level by the output of the oxygen concentration sensor 9 indicates that the output shift to the rich output side or lean output side. Specifically, as the output of the oxygen concentration sensor 9 changes with time to shift from the lean side to the rich side at time tR, the output of the oxygen concentration sensor 9 becomes rich at time tR. Therefore, at this time tR, the ECU 20 outputs a command (target air-fuel ratio) to make the air-fuel ratio of the exhaust gas flowing into the three-way catalyst 7 equal to a predetermined lean air-fuel ratio AFL by means of the fuel injection valve 6. Consequently, the actual air-fuel ratio of the exhaust gas follows the change represented by line L2.

Moreover, since the target air-fuel ratio for the three-way catalyst 7 is set to the predetermined lean air fuel ratio AFL as described above, as time advances, the output of the oxygen concentration sensor 9 shifts from the rich side to the lean side crossing the stoichiometric level at time tL. Thus, it is determined that the output of the oxygen concentration sensor becomes lean at time tL, and the ECU 20 outputs a command (target air-fuel ratio) to make the air-fuel ratio of the exhaust gas flowing into the three-way catalyst 7 equal to the predetermined rich air-fuel ratio AFR through the fuel injection valve 6 at this time tL. In consequence, after the time tL, the actual air-fuel ratio of the exhaust gas flowing into the three-way catalyst 7 approaches the predetermined rich air-fuel ratio AFR.

As described above, in the Cmax method, the control of the air-fuel ratio of the exhaust gas flowing into the three-way catalyst 7 is performed in a mode for shifting it from the lean side to the rich side or a mode for shifting it from the rich side to the lean side in accordance with the output of the oxygen concentration sensor 8. The former mode will be referred to as the "rich shift mode", and the latter mode will be referred to as the "lean shift mode". In the Cmax method is based on the assumption that when the air-fuel ratio of the exhaust gas flowing into the three-way catalyst 7 is on the lean side of the stoichiometry in the lean shift mode, oxygen in the exhaust gas is stored in the three-way catalyst 7 and that when the storage amount reaches a limit, exhaust gas with large oxygen content (i.e. lean exhaust gas) starts to flow out of the three-way catalyst 7. Therefore, the hatched area M1 in FIG. 2(*a*) represents the maximum oxygen storage amount of the three-way catalyst 7. On the other hand, it is considered that when the air-fuel ratio of the exhaust gas flowing into the three-way catalyst 7 is on the rich side of the stoichiometry in the rich shift mode, oxygen stored in the three-way catalyst 7 is released and that when the release ends, exhaust gas with small oxygen content (i.e. rich exhaust gas) starts to flow out of the three-way catalyst 7. Therefore, the hatched area M2 in FIG. 2(*a*) represents the maximum oxygen release amount of the three-way catalyst 7.

Theoretically, the oxygen storage amount of the three-way catalyst 7 represented by the hatched area M1 and the oxygen release amount of the three-way catalyst 7 represented by the hatched area M2 are equal to each other. However, to reduce calculation error, the average of the oxygen storage amount and the oxygen release amount is taken as the OSC of the three-way catalyst 7. Referring to specific calculation of the oxygen storage amount and the oxygen release amount, they can be calculated from the difference between the measurement value of the air-fuel ratio sensor 8 and the stoichiometric air-fuel ratio (air-fuel ratio difference) and parameters such as the quantity of fuel injected through the fuel injection valve and the proportion of oxygen in air. The method of calculation is well-known and will not be described in detail.

Figure 3:
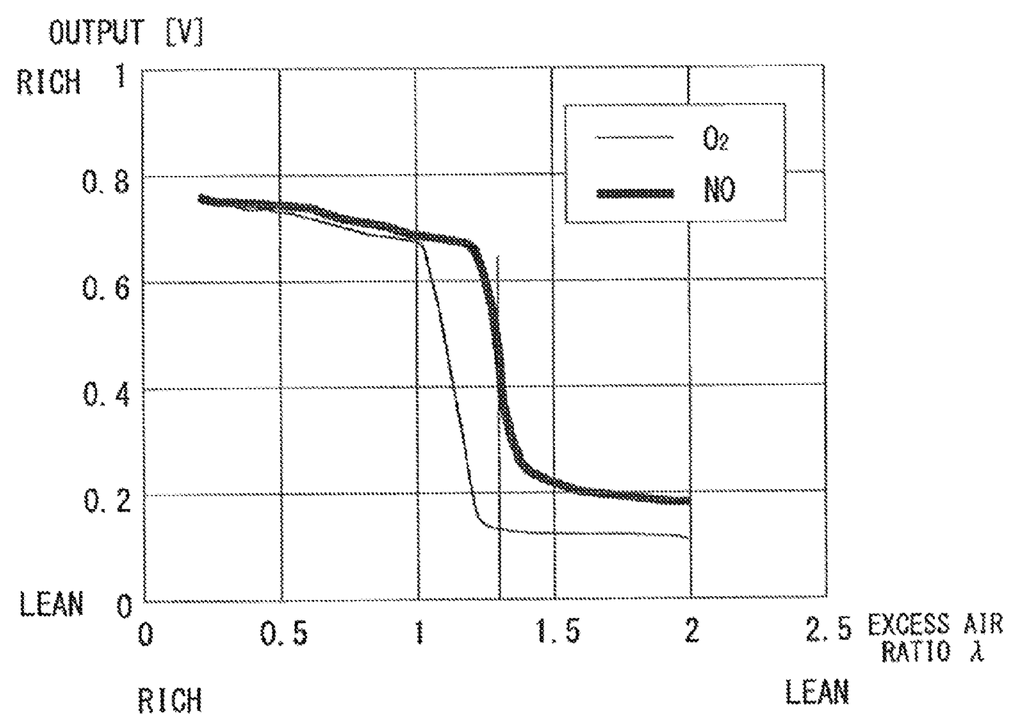
FIG. 3 is a graph showing output characteristics of an oxygen concentration sensor that vary among kinds of lean gas components.

As described above, in the Cmax method, the rich shift mode and the lean shift mode for controlling the air-fuel ratio of the exhaust gas flowing into the three-way catalyst 7 are performed based on the output value of the oxygen concentration sensor 9 provided downstream of the three-way catalyst 7. The oxygen concentration sensor 9 has what is called Z-characteristics as described above. The Z-characteristic is that the output value of the sensor changes abruptly in the neighborhood of the stoichiometry of the measurement target gas. This characteristics vary with the kinds of lean gas components contained in the measurement target gas (i.e. gas components contributing to leaner outputs of the oxygen concentration sensor 9). FIG. 3 shows a difference in the output characteristics of the oxygen concentration sensor 9 in a case where two lean gas components ($O_2$, NO) are swept relative to CO as a rich gas component (i.e. gas component contributing to richer outputs of the oxygen concentration sensor 9). The horizontal axis in FIG. 3 represents the excess air ratio λ with the respective lean gas components, and the vertical axis represents the output voltage of the oxygen concentration sensor 9. With the oxygen concentration sensor 9, the lower the oxygen concentration in the measurement target gas is, or the richer the air-fuel ratio of the gas is, the higher the output voltage is.

As shown in FIG. 3, the abrupt change point of the output of the oxygen concentration sensor 9 in the case where the lean gas component is NO is shifted from that in the case where the lean gas component is $O_2$ toward higher or leaner excess air ratios λ. This shows that even if the amount of CO as a rich gas component contained in the measurement target gas is the same, the output characteristics of the oxygen concentration sensor 9 can vary with the kinds of lean gas components. Moreover, there is a tendency that the measurement sensitivity to the lean gas components decreases particularly when the amount of NOx such as NO contained in the measurement target gas increases.

Figure 4:
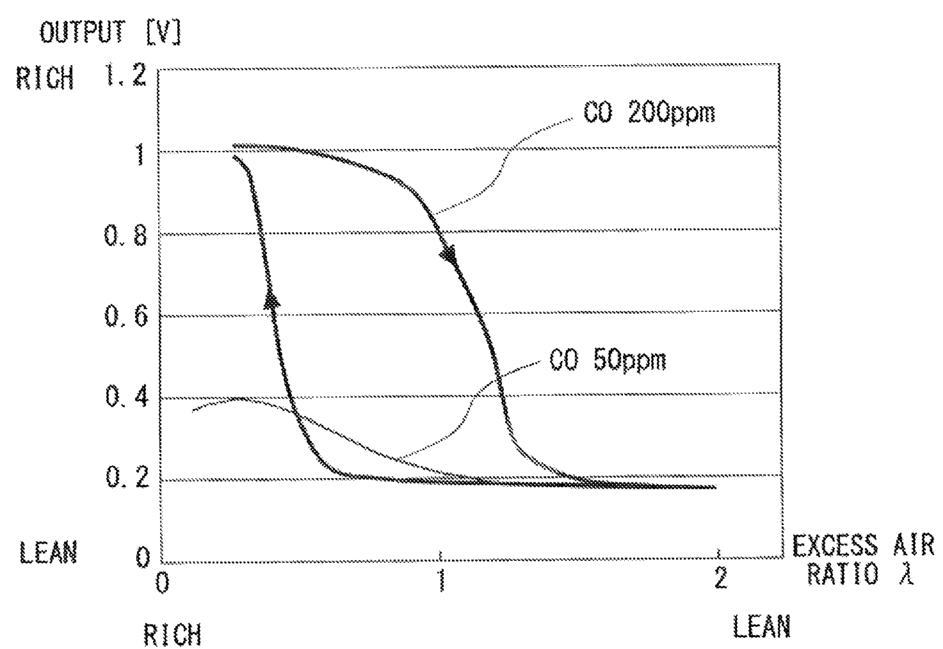
FIG. 4 is a graph showing output characteristics of the oxygen concentration sensor that vary with the content of a rich gas component.

The output characteristics of the oxygen concentration sensor 9 also depend on the concentration of the rich gas components. By way of example, FIG. 4 shows a difference in the output characteristics of the oxygen concentration sensor 9 with a difference in the CO content in a case where $O_2$ as a lean gas component is swept relative to CO as a rich gas component. The horizontal axis in FIG. 4 represents the excess air ratio λ with $O_2$ as a lean gas component, and the vertical axis represents the output voltage of the oxygen concentration sensor 9. Output characteristics of the oxygen concentration sensor 9 for a case where the content of CO as a rich gas component is 200 ppm and a case where the content of CO is 50 ppm are shown in FIG. 4.

As shown in FIG. 4, the larger the content of CO as a rich gas component is, the higher the output voltage of the oxygen concentration sensor 9 is. Moreover, the difference between the output characteristics with decreasing excess air ratio λ (or the output characteristics with increasing concentration of the rich gas component) and output characteristics with increasing excess air ratio λ (or the output characteristics with decreasing concentration of the rich gas component), that is, the hysteresis of the output characteristics increases with an increase in the CO content. This shows that the oxygen concentration sensor 9 is greatly dependent on the concentration of the rich gas component in the measurement target gas, and there is a tendency that the higher the concentration of the rich gas component is, the higher the output voltage of the oxygen concentration sensor 9 is, namely the higher the measurement sensitivity to the rich gas component is.

Figure 5:
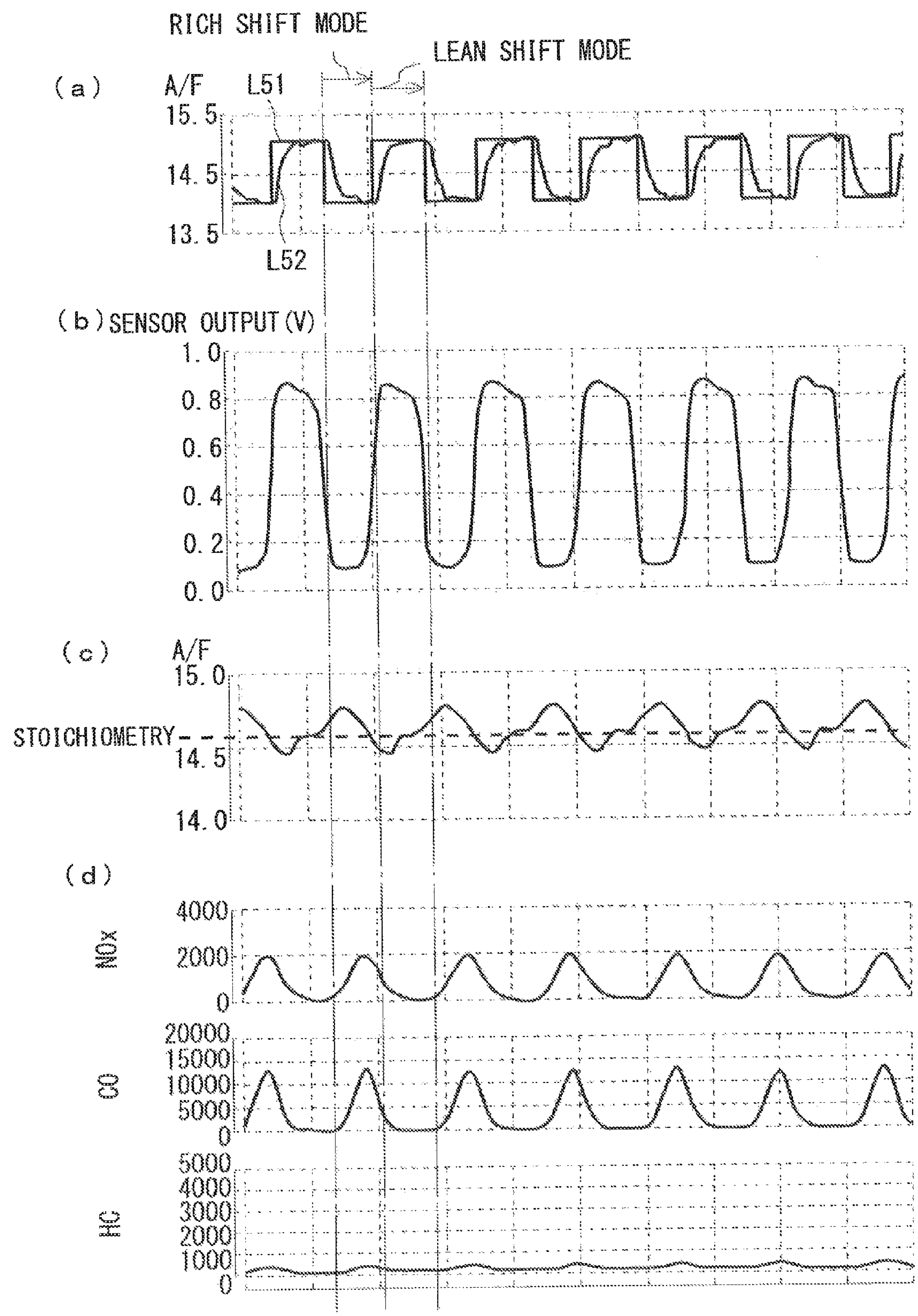
FIG. 5 shows the change with time of the air-fuel ratio of the exhaust gas flowing into a three-way catalyst, the change with time of the output of the oxygen concentration sensor, the change with time of the air-fuel ratio downstream of the three-way catalyst, and the change with time of the NOx content, the CO content, and the HC content in the exhaust gas flowing out of the three-way catalyst, in a case where the active air-fuel ratio control is performed by the conventional Cmax method.

Moreover, the applicant of the present patent application discovered that if the OSC of the three-way catalyst 7 is calculated using the Cmax method shown in FIG. 2 using the oxygen concentration sensor 9 having the above-described output characteristics, there is a possibility that the OSC may not be calculated accurately. This possibility will be discussed with reference to FIG. 5. FIG. 5 shows the changes with time of parameters in a case where the OSC of the three-way catalyst 7 is calculated by the conventional Cmax method. Specifically, graph (a) in FIG. 5 shows the change with time of the air-fuel ratio of the exhaust gas flowing into the three-way catalyst 7, where curve L51 represents the change with time of a command (target air fuel ratio) output by the ECU 20 pertaining to the air-fuel ratio of the exhaust gas flowing into the three-way catalyst 7, which is controlled by fuel injection through the fuel injection valve 6, and curve L52 represents the change with time of the air-fuel ratio of the exhaust gas actually flowing into the three-way catalyst 7, which is measured by the air-fuel ratio sensor 8. Graph (b) in FIG. 5 shows the change with time of the measurement value of the oxygen concentration sensor 9 while the air-fuel ratio of the exhaust gas is controlled based on the command (target air-fuel ratio) represented by curve L51 in graph (a) in FIG. 5. Graph (c) in FIG. 5 shows the change with time of the air-fuel ratio in the interior of the three-way catalyst 7 while the air-fuel ratio of the exhaust gas is controlled based on the command (target air-fuel ratio) represented by curve L51 in graph (a) in FIG. 5. Graph (d) in FIG. 5 shows the change with time of the NOx content, the CO content, and the HC content in the exhaust gas flowing out of the three-way catalyst 7 while the air-fuel ratio of the exhaust gas is controlled based on the command (target air-fuel ratio) represented by curve L51 in graph (a) in FIG. 5.

In the Cmax method shown in FIG. 5, as with in the case shown in FIG. 2, the target air fuel ratio represented by curve 51 output by the ECU 20 changes in a step manner at the time when the output of the oxygen concentration sensor 9 becomes rich or lean. In this case, consequently, the lean shift mode and the rich shift mode for controlling the air-fuel ratio of the exhaust gas flowing into the three-way catalyst 7 take turns alternately stepwise. In this case, since the three-way catalyst 7 is subjected to abrupt changes in the exhaust gas air-fuel ratio, an environment that allows sufficient storage and release of oxygen in the three-way catalyst 7 is hard to be established. Consequently, the gas flowing out of the three-way catalyst 7 contains NOx as a lean gas component and CO and HC as rich gas components in a mixed manner, and the oxygen concentration sensor 9 shows a characteristic that it outputs a voltage corresponding to a highly rich air-fuel ratio though the richness of the air-fuel ratio of the exhaust gas is actually low, due to the above-described decrease in the measurement sensitivity to the lean gas component and strong dependency on the concentration of the rich gas component. This characteristic of the oxygen concentration sensor 9, that is, a characteristic that excessively high values are output for rich air-fuel ratios will be referred to as “overly rich output characteristics”.

Due to the overly rich output characteristics, a sufficiently rich air-fuel ratio state (e.g. a state in which the air-fuel ratio is equal to the predetermined rich air-fuel ratio AFR shown in FIG. 2) is not established in the three-way catalyst 7 in some cases, or if it is established, the duration of time during which this state is maintained is relatively short in some cases. In the illustrative case shown in FIG. 5, as shown in graph (c) in FIG. 5, the magnitude of change in the air-fuel ratio of the exhaust gas in the interior of the three-way catalyst 7 is smaller on the rich side than on the rich side, namely the shift of the air-fuel ratio of the exhaust gas from the reference level at the stoichiometry is smaller on the rich side.

In the Cmax method, if the air-fuel ratio of the exhaust gas in the interior of the three-way catalyst 7 fails to become sufficiently rich due to the above-described characteristics of the oxygen concentration sensor 9, the oxygen release amount of the three-way catalyst 7 will be calculated to be smaller consequently, leading to a decrease in the accuracy in calculating the OSC of the three-way catalyst 7. If the OSC of the three-way catalyst 7 determined by calculation is smaller than the actual OSC, there is a possibility that an erroneous determination that the three-way catalyst 7 is deteriorated may be made, even when the three-way catalyst 7 is not deteriorated. In view of the above, when the Cmax method is employed in calculating the OSC of the three-way catalyst 7, it is necessary to take into account the above-described characteristics of the oxygen concentration sensor 9 adequately.

Moreover, when the three-way catalyst 7 is sulfur-poisoned (S-poisoned) due to sulfur components (S-components) in the exhaust gas, the exhaust gas purification performance of the three-way catalyst 7 is deteriorated consequently. Then, the amount of the rich gas components (HC etc.) in the exhaust gas flowing out of the three-way catalyst 7 increases, and the magnitude of change in the air-fuel ratio in the interior of the three-way catalyst 7 is made small due to the overly rich output characteristics of the oxygen concentration sensor 9 when the rich shift mode is performed in the Cmax method. Consequently, the OSC of the three-way catalyst 7 is calculated to be smaller.

Figure 6:
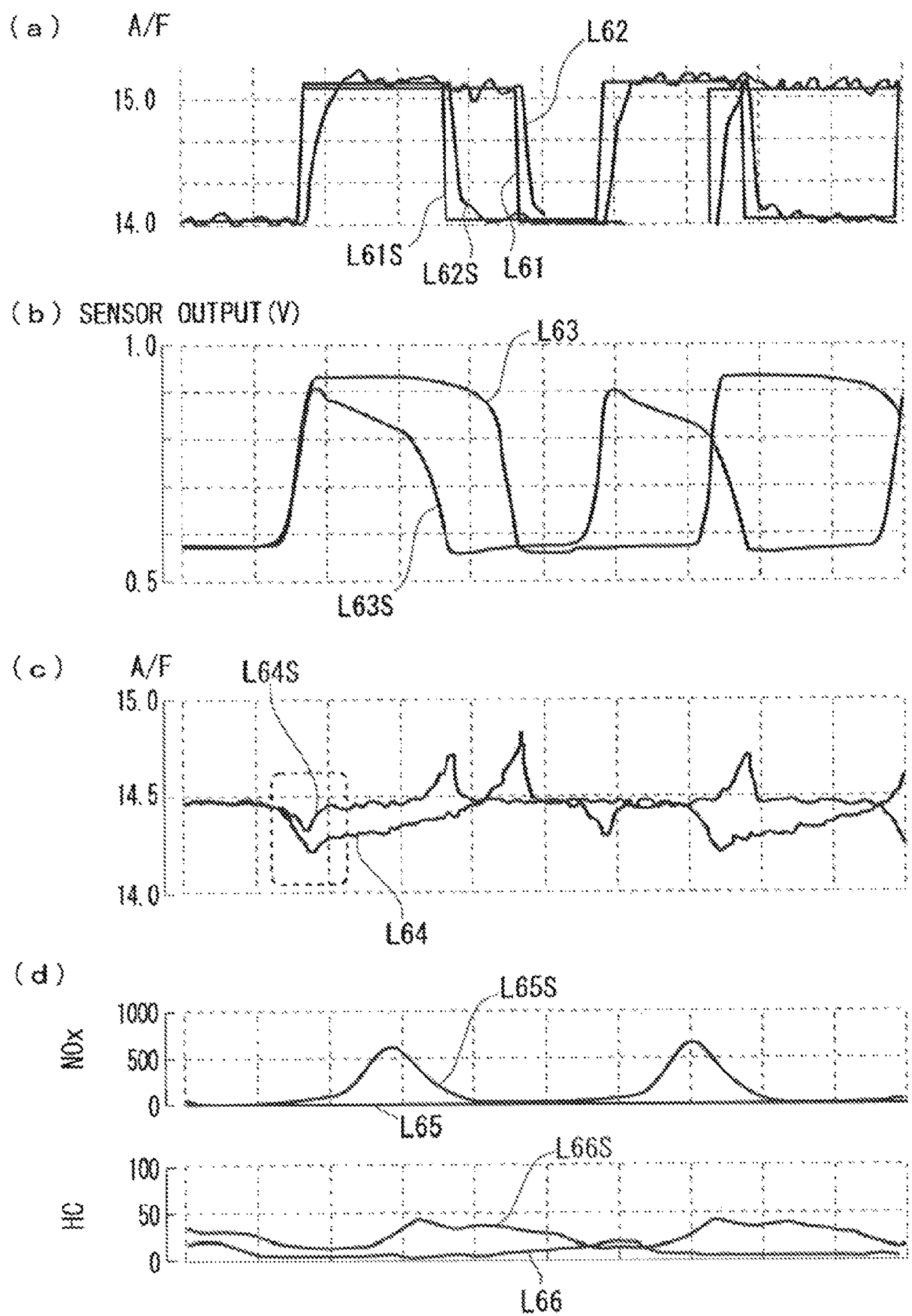
FIG. 6 shows the change with time of the air-fuel ratio of the exhaust gas flowing into a three-way catalyst, the change with time of the output of the oxygen concentration sensor, the change with time of the air-fuel ratio downstream of the three-way catalyst, and the change with time of the NOx content, and the HC content in the exhaust gas flowing out of the three-way catalyst during the active air-fuel ratio control performed by the conventional Cmax method for a case where the fuel used in the internal combustion engine contains sulfur and for a case where the fuel used in the internal combustion engine does not contain sulfur.

The deterioration of accuracy in calculating the OSC due to S-poisoning of the three-way catalyst 7 will be specifically described with reference to FIG. 6. FIG. 6 shows the changes with time of parameters in a process performed to calculate the OSC of the three-way catalyst 7 using the conventional Cmax method in a case where a normal fuel that contains little S-components is used and in a case where an S-containing fuel that contains 200 ppm of S-components is used. The curves representing the changes in the parameters in the case where the S-containing fuel is used are denoted by reference numerals having a suffix "S", and the curves representing the changes in the parameters in the case where the normal fuel is used are denoted by reference numerals without a suffix S. Graph (a) in FIG. 6 shows the change in the air-fuel ratio of the exhaust gas flowing into the three-way catalyst 7. Specifically, curve L61 represents the change with time of a command (target air-fuel ratio) output by the ECU 20 pertaining to the air-fuel ratio of the exhaust gas flowing into the three-way catalyst 7, which is controlled by fuel injection through the fuel injection valve 6, and curve L62 represents the change with time of the air-fuel ratio of the exhaust gas actually flowing into the three-way catalyst 7, which is measured by the air-fuel ratio sensor 8. Changing curve L63 in graph (b) in FIG. 6 represents the change with time of the measurement value of the oxygen concentration sensor 9 while the air-fuel ratio of the exhaust gas is controlled based on the command (target air-fuel ratio) represented by curve L61 in graph (a) in FIG. 6. Changing curve L64 in graph (c) in FIG. 6 represents the change with time of the air-fuel ratio in the interior of the three-way catalyst 7 while the air-fuel ratio of the exhaust gas is controlled based on the command (target air-fuel ratio) represented by curve L61 in graph (a) in FIG. 6. Changing curves L65 and L66 in graph (d) in FIG. 6 represent the changes with time of the NOx content and the HC content in the exhaust gas flowing out of the three-way catalyst 7 while the air-fuel ratio of the exhaust gas is controlled based on the command (target air-fuel ratio) represented by curve L61 in graph (a) in FIG. 6. Curves L61S, L62S, L63S, L64S, and L65S represent the changes with time of the parameters whose changes are represented by curves L61, L62, L62, L63, L64, and L65 respectively in the case where the S-containing fuel is used.

As shown in graph (d) in FIG. 6, since the S-containing fuel contains a relatively large amount of S-components, the three-way catalyst 7 is S-poisoned, and its exhaust gas purification performance deteriorates, leading to an increase in the NOx concentration and the HC concentration in the exhaust gas flowing out of the three-way catalyst 7. Consequently, as shown in graph (b) in FIG. 6, when the lean shift mode is started, rich outputs of the oxygen concentration sensor 9 do not continue so long in the case where the S-containing fuel is used as in the case where the normal fuel is used, due to the overly rich output characteristics of the oxygen concentration sensor 9. Therefore, in the case where the S-containing fuel is used, the magnitude of change in the air-fuel ratio in the interior of the three-way catalyst 7 is smaller than that in the case where the normal fuel is used, as shown in graph (c) in FIG. 6. Consequently, the OSC of the three-way catalyst 7 calculated from the change with time of the exhaust gas air-fuel ratio shown in graph (a) in FIG. 6 is smaller than the actual OSC.

Furthermore, since the overly rich output characteristics of the oxygen concentration sensor 9 makes it difficult to establish a sufficiently rich air-fuel ratio state in the interior of the three-way catalyst 7 as shown in graph (c) in FIG. 6, it is difficult to remove S-poisoning of the S-poisoned three-way catalyst 7 during the process of the Cmax method. In consequence, there is a possibility that the amount of the rich gas components in the exhaust gas flowing out of the three-way catalyst 7 may further increase to make the overly rich output characteristics of the oxygen concentration sensor 9 worse in a vicious circle.

Figure 7:
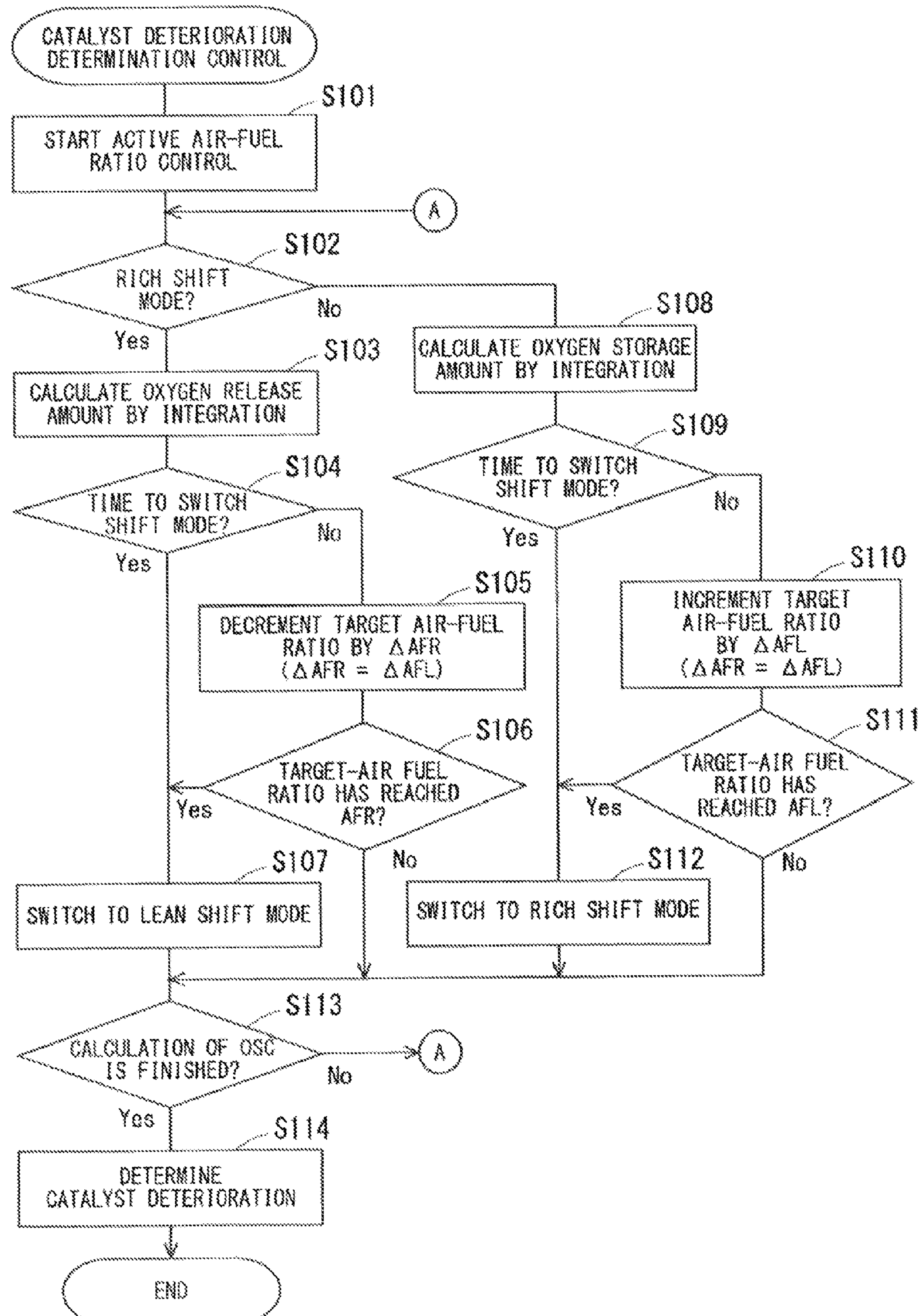
FIG. 7 is a flow chart of a catalyst deterioration determination control according to a first embodiment of the present invention.

As described above, in the conventional Cmax method shown in FIGS. 2 and 5, there is a possibility that the OSC of the three-way catalyst 7 may be calculated to be smaller than the actual OSC due to the overly rich output characteristics of the oxygen concentration sensor 9. The applicant of the present patent application has solved this problem with the conventional Cmax method and invented a control that enables calculation of the OSC of the three-way catalyst 7 with improved accuracy. The accurate calculation of the OSC is considered to be very useful because it helps appropriate determination as to deterioration of the three-way catalyst 7. A specific embodiment of calculation of the OSC according to the present invention and control for determining deterioration of the three-way catalyst 7 based on the calculated OSC will be described with reference to FIG. 7. FIG. 7 is a flow chart of a catalyst deterioration determination control executed by the ECU 20. This control is executed by the ECU 20 repeatedly at regular intervals. The ECU 20 is substantially a computer including a CPU and a memory etc., which executes a control program to carry out the control according to the flow chart of FIG. 7 and various controls that will be described later.

Figure 8:
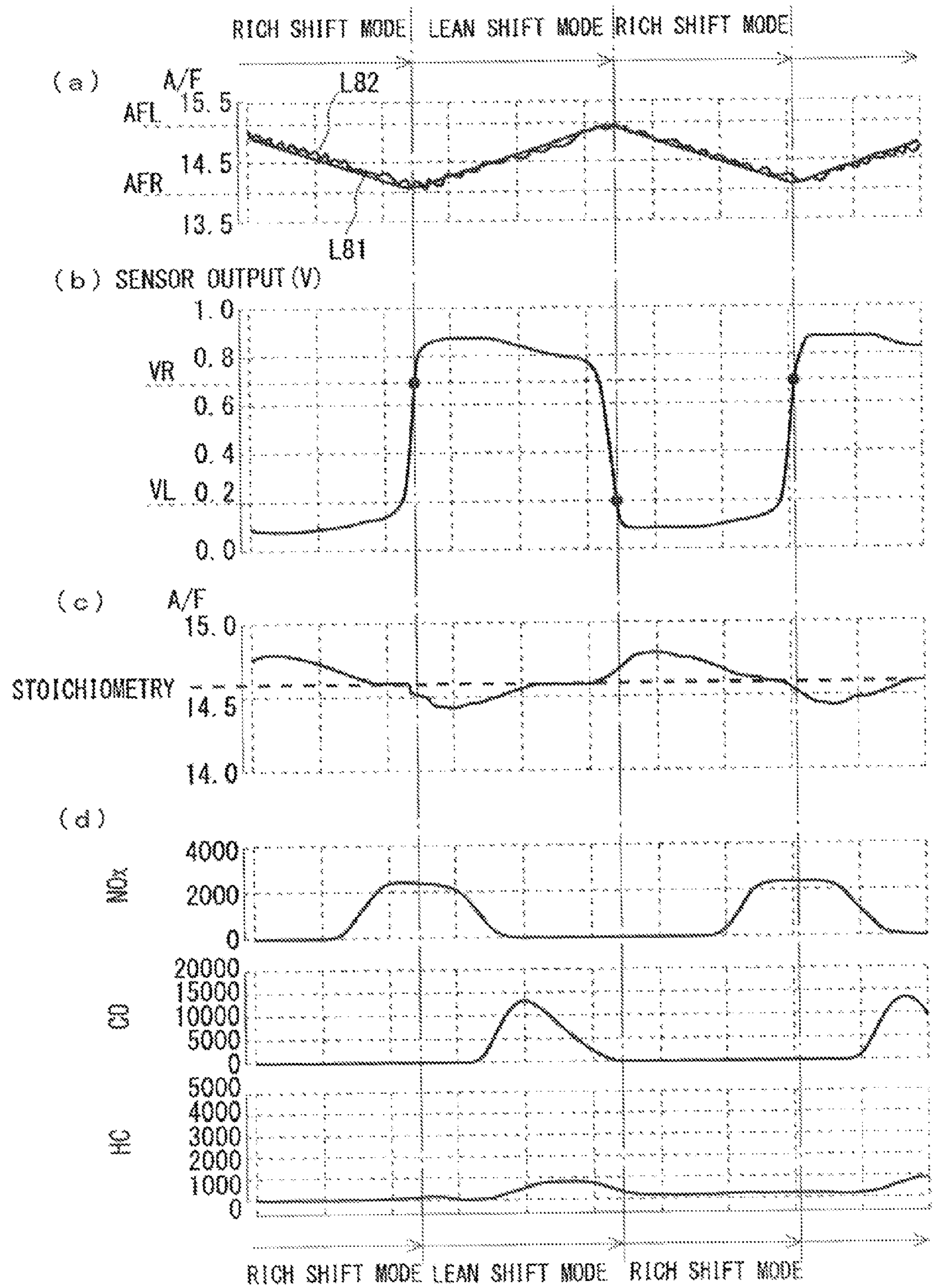
FIG. 8 shows the change with time of the air-fuel ratio of the exhaust gas flowing into a three-way catalyst, the change with time of the output of the oxygen concentration sensor, the change with time of the air-fuel ratio downstream of the three-way catalyst, and the change with time of the NOx content, the CO content, and the HC content in the exhaust gas flowing out of the three-way catalyst, in a case where the catalyst deterioration determination control shown in FIG. 7 is performed.

FIG. 8 shows the changes with time of parameters in calculating the OSC of the three-way catalyst 7 by the improved Cmax method according to the present invention while the catalyst deterioration determination control shown in FIG. 7 is being executed. The modes of representation of the parameters shown in FIG. 8 are the same as the modes of representation of the parameters shown in FIG. 5. Specifically, curve L81 in graph (a) in FIG. 8 represents the change with time of a command (target air fuel ratio) output by the ECU 20 pertaining to the air-fuel ratio of the exhaust gas flowing into the three-way catalyst 7, which is controlled by fuel injection through the fuel injection valve 6, and curve L82 represents the change with time of the air-fuel ratio of the exhaust gas actually flowing into the three-way catalyst 7, which is measured by the air-fuel ratio sensor 8. Graph (b) in FIG. 8 shows the change with time of the measurement value of the oxygen concentration sensor 9, as with graph (b) in FIG. 5. Graph (c) in FIG. 8 shows the change with time of the air-fuel ratio in the interior of the three-way catalyst 7, as with graph (c) in FIG. 5. Graph (d) in FIG. 8 shows the changes with time of the NOx content, the CO content, and the HC content in the exhaust gas flowing out of the three-way catalyst 7, as with graph (d) in FIG. 5.

First in step S101, the active air-fuel ratio control is started. The active air-fuel ratio control is a control for actively changing the air-fuel ratio of the exhaust gas flowing into the three-way catalyst 7 between a predetermined lean air fuel ratio AFL (e.g. 15) and a predetermined rich air-fuel ratio AFR (e.g. 14) with the stoichiometric air-fuel ratio (14.6) in-between in order to calculate the OSC of the three-way catalyst 7 by the Cmax method. In the active air-fuel ratio control, the mode in which the exhaust gas air-fuel ratio is shifted from lean to rich will be referred to as the "rich shift mode". On the other hand, the mode in which the exhaust gas air-fuel ratio is shifted from rich to lean will be referred to as the "lean shift mode. In this embodiment, as described later, the change of the exhaust gas air-fuel ratio in the active air-fuel ratio control is gradual change. Therefore, the command (target air-fuel ratio) output from the ECU 20 also changes gradually in both the lean shift mode and the rich shift mode, as shown by curve L81 in graph (a) in FIG. 8. This gradual change of the exhaust gas air-fuel ratio corresponds to the "state in which the rate of change of the exhaust gas air-fuel ratio is limited to a predetermined rate of change" according to the present invention. After the completion of the processing of step S101, the process proceeds to step S102.

In step S102, it is determined whether or not the shift mode in the active air-fuel ratio control is the rich shift mode. If the determination made in step S102 is affirmative, the processing of steps S103 to S107 is executed. If the determination made in step S102 is negative, the processing of steps S108 to S112 is executed. The former is a series of processing for gradually changing the air-fuel ratio of the exhaust gas and calculating the oxygen release amount of the three-way catalyst 7 in the rich shift mode. The latter is a series of processing for gradually changing the air-fuel ratio of the exhaust gas and calculating the oxygen release amount of the three-way catalyst 7 in the lean shift mode.

Firstly, the processing of steps S103 to S107 will be described. In step S103, the oxygen release amount of the three-way catalyst 7 is calculated by integration in the rich shift mode. The integration of the oxygen release amount is performed based on, for example, the changes with time of the air-fuel ratio of the exhaust gas actually flowing into the three-way catalyst 7 and the flow rate of the exhaust gas, as has been already described with reference to FIG. 2. Then, in step S104, it is determined whether or not it is the time to switch from the rich shift mode to the lean shift mode. Specifically, when the output voltage of the oxygen concentration sensor 9 exceeds a rich output VR (e.g. 0.7 V) as a threshold for switching, it is determined that the time for switching is reached. Thus, if the determination made in step S104 is affirmative, the process proceeds to step S107, where the mode is switched to the lean shift mode.

On the other hand, a negative determination made in step S104 leaves the rich shift mode to continue, and the process proceeds to step S105. In step S105, a target air-fuel ratio, which is issued by the ECU 20 to the fuel injection valve 6 for the active air-fuel ratio control, is decremented by ΔAFR. The value of ΔAFR is set to, for example, 0.002, and the magnitude of change in the air-fuel ratio in the active air-fuel ratio control in this embodiment is 1. Therefore, in step S105, the target air-fuel ratio is decreased by 0.2%. As will be described later, the processing of step S105 is executed repeatedly until the target air-fuel ratio reaches the predetermined rich air-fuel ratio AFR. Consequently, the target air-fuel ratio changes (decreases) gradually, as shown by curve L81 in graph (a) in FIG. 8. With the gradual change of the target air-fuel ratio in this way in the rich shift mode, a state in which the rate of change of the air-fuel ratio of the exhaust gas flowing into the three-way catalyst 7 is limited to be equal to or lower than a predetermined rate of change is established. In other words, a state in which the air-fuel ratio of the exhaust gas flowing into the three-way catalyst 7 gradually decreases to the predetermined rich air-fuel ratio AFR is established. After the completion of the processing of step S105, the process proceeds to step S106. In step S106, it is determined whether or not the target air-fuel ratio issued by the ECU 20 for the active air-fuel ratio control has reached the predetermined rich air-fuel ratio AFR. If the determination made in step S106 is affirmative, the process proceeds to step S107, where the mode is switched to the lean shift mode. On the other hand, if the determination made in step S106 is negative, the process proceeds to step S113.

Next, the processing of steps S108 to S112 will be described. In step S108, the oxygen storage amount of the three-way catalyst 7 is calculated by integration in the lean shift mode. The integration of the oxygen storage amount is similar to the integration of the oxygen release amount in step S103. Then, in step S109, it is determined whether or not it is the time to switch from the lean shift mode to the rich shift mode. Specifically, when the output voltage of the oxygen concentration sensor 9 falls short of a rich output VL (e.g. 0.2 V) as a threshold for switching, it is determined that the time for switching is reached. Thus, if the determination made in step S109 is affirmative, the process proceeds to step S112, where the mode is switched to the rich shift mode.

On the other hand, a negative determination made in step S109 leaves the lean shift mode to continue, and the process proceeds to step S110. In step S110, the target air-fuel ratio issued by the ECU 20 for the active air-fuel ratio control is incremented by ΔAFL. As with ΔAFR set in step S105, the value of ΔAFL is set to 0.002. The processing of step S110 is executed repeatedly until the target air-fuel ratio reaches the predetermined lean air-fuel ratio AFL. Consequently, the target air-fuel ratio changes (increases) gradually, as shown by curve L81 in graph (a) in FIG. 8. With the gradual change of the target air-fuel ratio in this way in the lean shift mode, a state in which the rate of change of the air-fuel ratio of the exhaust gas flowing into the three-way catalyst 7 is limited to be equal to or lower than a predetermined rate of change is established. In other words, a state in which the air-fuel ratio of the exhaust gas flowing into the three-way catalyst 7 gradually increases to the predetermined lean air-fuel ratio AFL is established. After the completion of the processing of step S110, the process proceeds to step S111. In step S111, it is determined whether or not the target air-fuel ratio issued by the ECU 20 for the active air-fuel ratio control has reached the predetermined lean air-fuel ratio AFL. If the determination made in step S111 is affirmative, the process proceeds to step S112, where the mode is switched to the rich shift mode. On the other hand, if the determination made in step S111 is negative, the process proceeds to step S113.

In step S113, it is determined whether or not the calculation of the OSC of the three-way catalyst 7 has been finished. For example, if the calculation of the oxygen release amount of the three-way catalyst 7 in the rich shift mode by integration of the oxygen release amount in step S103 and the calculation of the oxygen storage amount of the three-way catalyst 7 in the lean shift mode by integration of the oxygen storage amount in step S108 have been carried out predetermined times respectively, an affirmative determination is made in step S113. If the affirmative determination is made in step S113, the process proceeds to step S114. If the determination made in step S113 is negative, the processing starting from step S102 is repeated.

In step S114, a determination as to deterioration of the three-way catalyst 7 is made based on the OSC of the three-way catalyst 7. The value used as the OSC of the three-way catalyst 7 is the average of the oxygen release amount and the oxygen storage amount of the three-way catalyst 7 calculated predetermined times respectively as described above. If the OSC of the three-way catalyst 7 is smaller than a predetermined OSC as a criterion of deterioration determination, it is determined that the three-way catalyst 7 is deteriorated. When it is determined that the three-way catalyst 7 is deteriorated, it is preferred that a user be notified of this fact.

As described above, in calculating the OSC of the three-way catalyst 7 in the catalyst deterioration determination control shown in FIG. 7, the air-fuel ratio of the exhaust gas flowing into the three-way catalyst 7 is decreased gradually and increased gradually in the rich shift mode and the lean shift mode of the active air-fuel ratio control. In consequence, it is possible to calculate the OSC of the three-way catalyst 7 in both the modes with improved accuracy as described in the following.

(1) In the Rich Shift Mode

In regard to the exhaust gas flowing out of the three-way catalyst 7, gradual decrease in the air-fuel ratio of the inflowing exhaust gas allows sufficient reaction time for oxygen stored in the three-way catalyst 7 to be released. Consequently, the rich gas components in the outflowing exhaust gas is prevented from increasing abruptly, and the increase speed is slowed down. Thus, if the air-fuel ratio in the interior of the three-way catalyst 7 is decreased gradually (to shift to rich air-fuel ratios), sufficient time for releasing oxygen stored in the three-way catalyst 7 is ensured, even if it is sulfur-poisoned to some extent.

As described above, by slowing-down the increase in the rich gas components in the exhaust gas flowing out of the three-way catalyst 7, the influence of the overly rich output characteristics of the oxygen concentration sensor 9 provided downstream of the three-way catalyst 7 is decreased. Consequently, a situation in which switching to the lean shift mode is performed too early by erroneously determining that the amount of rich gas components in the atmosphere to which the oxygen concentration sensor 9 is exposed is large though the amount of rich gas components is small in reality can be prevented from occurring. Consequently, in this embodiment, the air-fuel ratio state in the interior of the three-way catalyst 7 can be kept sufficiently rich for a relatively long period of time by the rich shift mode, as shown in graph (c) in FIG. 8. This is clearly different from the change with time of the air-fuel ratio shown in graph (c) in FIG. 5 according to the prior art. Moreover, as a sufficiently rich state is established in the interior of the three-way catalyst 7 in spite of the overly rich output characteristics of the oxygen concentration sensor 9, the OSC of the three-way catalyst 7 is expected to be calculated accurately.

(2) In Lean Shift Mode

As the air-fuel ratio of the exhaust gas flowing into the three-way catalyst 7 is gradually increased, the storage of oxygen in the three-way catalyst 7 progresses gradually. Then, the concentration of the rich gas components contained in the exhaust gas flowing out of the three-way catalyst 7 once increases but then immediately decreases as shown in graph (d) in FIG. 8. At the time when the oxygen storage in the three-way catalyst 7 comes to saturation, the concentration of the rich gas components is very low, and the oxygen concentration in the exhaust gas flowing out of the three-way catalyst 7 starts to increase. Then, the oxygen concentration sensor 9 makes a lean output, as shown in graph (c) in FIG. 8.

As described above, the time at which the rich gas components/the lean gas components (exhaust gas with high oxygen concentration) emerge in the exhaust gas flowing out of the three-way catalyst 7 is more distinct than in the case shown in FIG. 5. Due to the above-described overly rich output characteristics, the oxygen concentration sensor 9 cannot output a value close to the actual lean air-fuel ratio, unless the atmosphere around the sensor is in a somewhat definitely lean state. As described above, since the gradual change of the air-fuel ratio of the inflowing exhaust gas makes the boundaries of the emergence of the rich gas components and the lean gas components in the outflowing exhaust gas distinct, it is possible to makes a lean output close to the actual air-fuel ratio of the exhaust gas. In consequence, the oxygen concentration sensor 9 can detect the timing of saturation of the oxygen storage in the three-way catalyst 7, and therefore the OSC of the three-way catalyst 7 can be calculated accurately.

In active air-fuel ratio control in the above-described embodiment, the exhaust gas air-fuel ratio is decremented by ΔAFR in the rich shift mode and incremented by ΔAFL in the lean shift mode. The gradual decrease amount ΔAFR and the gradual increase amount ΔAFL may be set based on the response time of the oxygen concentration sensor 9 to the rich gas components and the response time of the oxygen concentration sensor 9 to the lean gas components respectively. Specifically, the air-fuel ratio of the exhaust gas flowing into the three-way catalyst 7 is changed gradually by ΔAFR or ΔAFL over a time longer than the response time of the oxygen concentration sensor 9 to the rich gas components or the lean gas components. This can reduce an error between the change with time of the air-fuel ratio of the exhaust gas flowing into the three-way catalyst 7 and the change with time of the output of the oxygen concentration sensor 9 with which the change with time of the air-fuel ratio is controlled, thereby making it possible to calculate the OSC of the three-way catalyst 7 accurately and to determine deterioration of the three-way catalyst 7 accurately using the improved Cmax method.

In practice, in view of individual variations of oxygen concentration sensors 9, the gradual decrease amount ΔAFR and the gradual increase amount ΔAFL may be set based on the slowest response time in the range of tolerance of the response time of the oxygen concentration sensor 9 to the rich gas components and the lean gas components.

Embodiment 2

Figure 9:
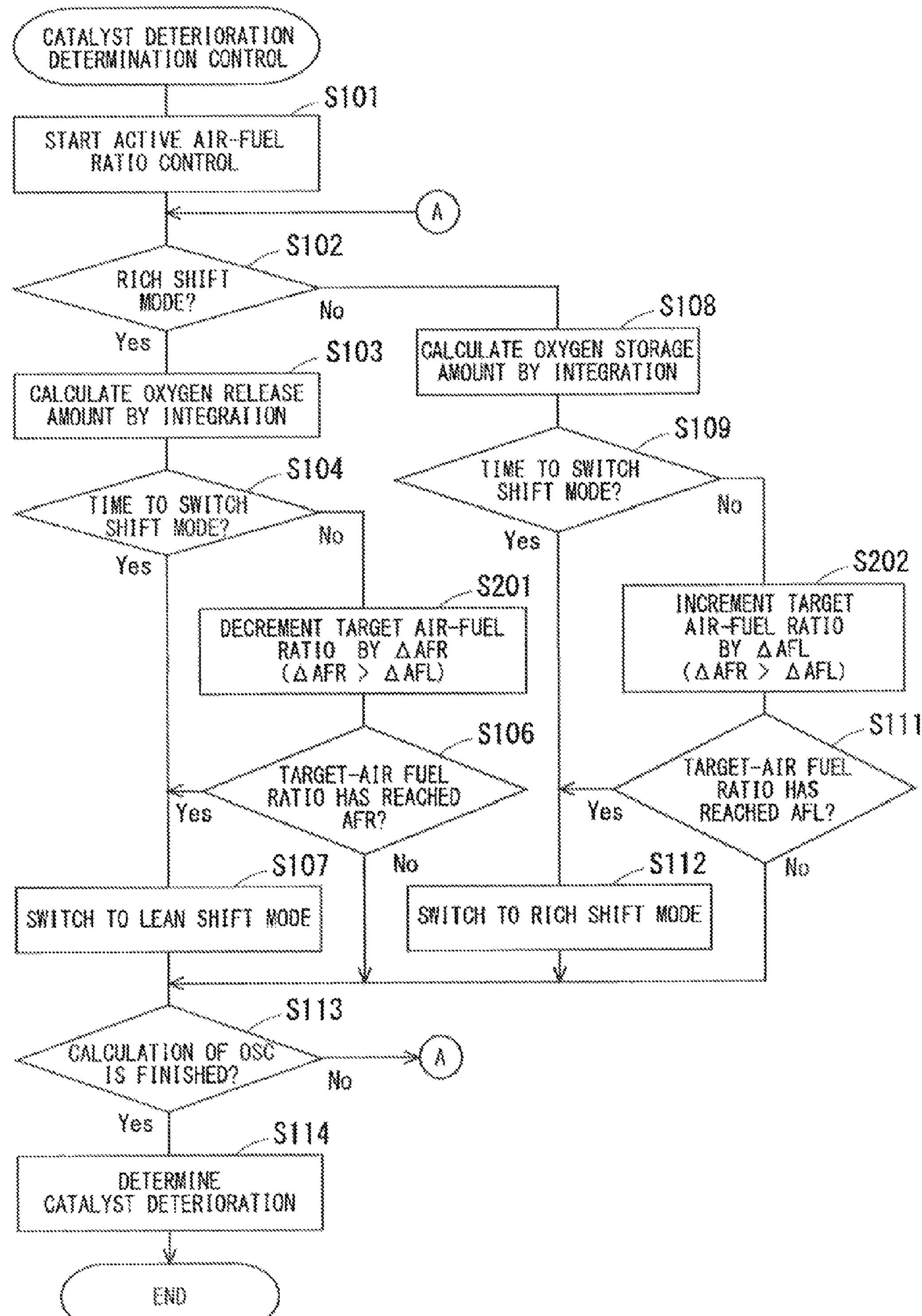
FIG. 9 is a flow chart of a catalyst deterioration determination control according to a second embodiment of the present invention.

A second embodiment of the present invention will be described with reference to FIG. 9. FIG. 9 is a flow chart of a catalyst deterioration determination control according to the second embodiment. The processing steps the same as those in the catalyst deterioration determination control shown in FIG. 7 are denoted by the same reference numerals and will not be described in detail. In the catalyst deterioration determination control shown in FIG. 9, the processing of step S105 in the catalyst deterioration determination control shown in FIG. 7 is replaced by the processing of step S201, and the processing of step S110 in the catalyst deterioration determination control shown in FIG. 7 is replaced by the processing of step S202.

Specifically, in the rich shift mode, if the determination made in step S104 is negative, the process proceeds to step S201. In step S201, the target air-fuel ratio, which is a command issued by the ECU 20 to the fuel injection valve 6 for the active air-fuel ratio control, is decremented by ΔAFR. After the completion of the processing of step S201, the process proceeds to step S106. In the lean shift mode, if the determination made in step S109 is negative, the process proceeds to step S202. In step S202, the target air-fuel ratio, which is a command issued by the ECU 20 to the fuel injection valve 6 for the active air-fuel ratio control, is incremented by ΔAFL. After the completion of the processing of step S202, the process proceeds to step S111. The relationship between ΔAFR and ΔAFL is ΔAFR>ΔAFL, for example, ΔAFR=0.005 and ΔAFL=0.002.

As described above, when the catalyst deterioration determination control shown in FIG. 9 is performed, the air-fuel ratio of the exhaust gas flowing into the three-way catalyst 7 is gradually decreased and increased by the active air-fuel ratio control in the same manner as in the catalyst deterioration determination control shown in FIG. 7. However, since the relationship ΔAFR>ΔAFL is set in the active air-fuel ratio control as described above, the rate of change (the absolute value of the speed of change) of the exhaust gas air-fuel ratio in the rich shift mode is set to be higher than the rate of change (the absolute value of the speed of change) of the exhaust gas air-fuel ratio in the lean shift mode. Since the oxygen concentration sensor 9 has the above-described overly rich output characteristics, its response speed to the exhaust gas having a rich air-fuel ratio is higher than its response speed to the exhaust gas having a lean air-fuel ratio. Therefore, even when the value of ΔAFR is set to be larger than the value of ΔAFL, the change with time of the air-fuel ratio substantially the same in magnitude as the change with time of the air-fuel ratio in the interior of the three-way catalyst 7 shown in graph (c) in FIG. 8 can be achieved. Setting the value of ΔAFR larger can lead a decrease in the time taken by the rich shift mode. Thus, the amount of NOx emission with the change of the air-fuel ratio in the interior of the three-way catalyst 7 from the range near the stoichiometry to rich air-fuel ratios can be reduced.

Embodiment 3

Figure 10:
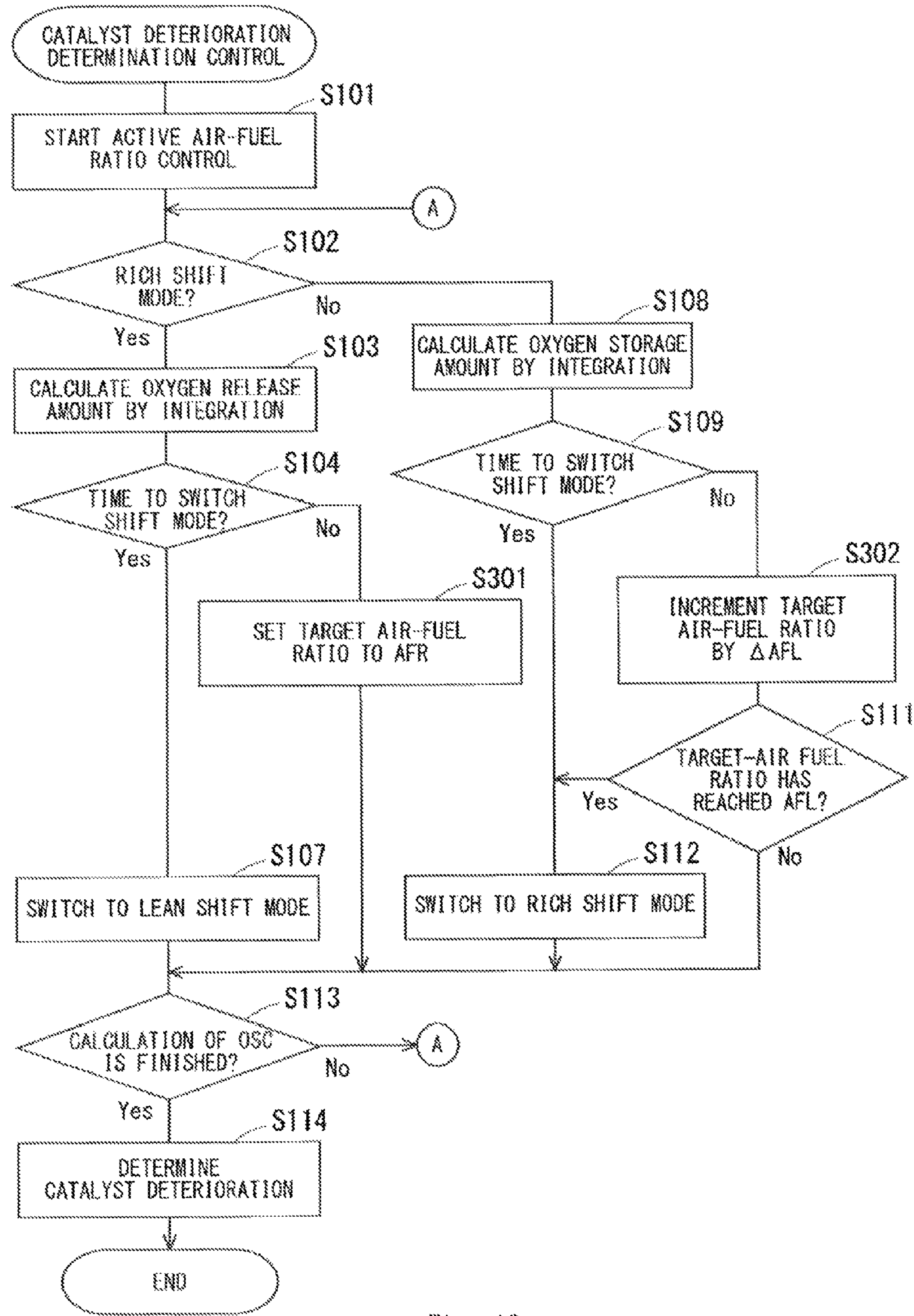
FIG. 10 is a flow chart of a catalyst deterioration determination control according to a third embodiment of the present invention.

A third embodiment of the present invention will be described with reference to FIG. 10. FIG. 10 is a flow chart of a catalyst deterioration determination control according to the third embodiment. The processing steps the same as those in the catalyst deterioration determination control shown in FIG. 7 are denoted by the same reference numerals and will not be described in detail. In the catalyst deterioration determination control shown in FIG. 10, the processing of steps S105 and S106 in the catalyst deterioration determination control shown in FIG. 7 is replaced by the processing of step S301, and the processing of step S110 in the catalyst deterioration determination control shown in FIG. 7 is replaced by the processing of step S302.

Figure 11:
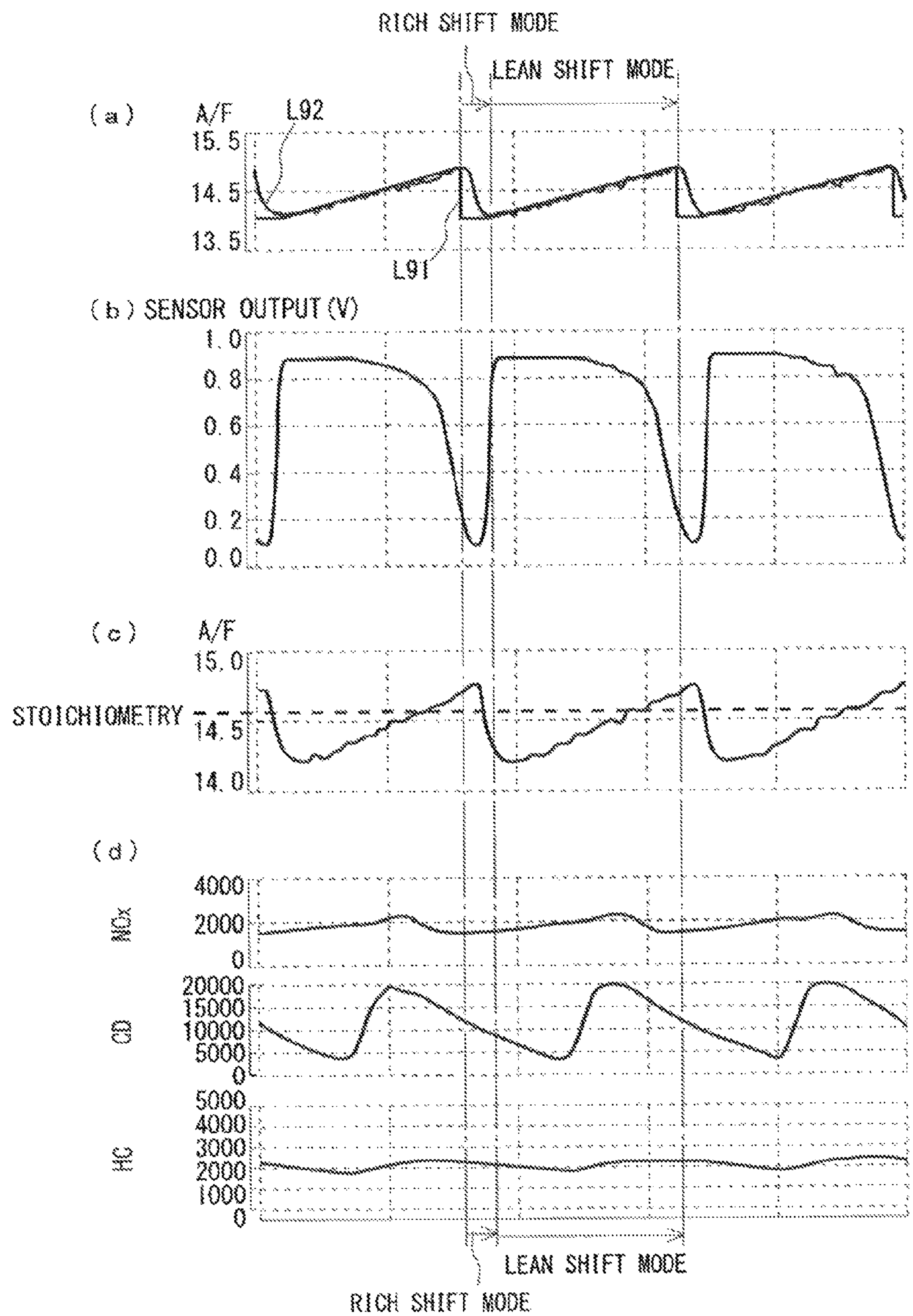
FIG. 11 shows the change with time of the air-fuel ratio of the exhaust gas flowing into a three-way catalyst, the change with time of the output of the oxygen concentration sensor, the change with time of the air-fuel ratio downstream of the three-way catalyst, and the change with time of the NOx content, the CO content, and the HC content in the exhaust gas flowing out of the three-way catalyst, in a case where the catalyst deterioration determination control shown in FIG. 10 is performed.

FIG. 11 shows the changes with time of parameters in a case where the OSC of the three-way catalyst 7 is calculated by the improved Cmax method according to the present invention in the catalyst deterioration determination control shown in FIG. 10. The modes of representation of the parameters shown in FIG. 11 are the same as the modes of representation of the parameters shown in FIGS. 5 and 8. Specifically, curve L91 in graph (a) in FIG. 11 represents the change with time of a command (target air fuel ratio) output by the ECU 20 pertaining to the air-fuel ratio of the exhaust gas flowing into the three-way catalyst 7, which is controlled by fuel injection through the fuel injection valve 6, and curve L92 represents the change with time of the air-fuel ratio of the exhaust gas actually flowing into the three-way catalyst 7, which is measured by the air-fuel ratio sensor 8. Graph (b) in FIG. 11 shows the change with time of the measurement value of the oxygen concentration sensor 9, as with graph (b) in FIG. 5. Graph (c) in FIG. 11 shows the change with time of the air-fuel ratio in the interior of the three-way catalyst 7, as with graph (c) in FIG. 5. Graph (d) in FIG. 11 shows the changes with time of the NOx content, the CO content, and the HC content in the exhaust gas flowing out of the three-way catalyst 7, as with graph (d) in FIG. 5.

In the catalyst deterioration determination control shown in FIG. 10, in the rich shift mode, if the determination made in step S104 is negative, the process proceeds to step S301. In step S301, the target air-fuel ratio, which is a command issued by the ECU 20 to the fuel injection valve 6 for the active air-fuel ratio control, is set to a predetermined rich air fuel ratio AFR as a target value to be reached in the rich shift mode. On the other hand, in the lean shift mode, if the determination made in step S109 is negative, the process proceeds to step S302. In step S302, the target air-fuel ratio, which is a command issued by the ECU 20 to the fuel injection valve 6 for the active air-fuel ratio control, is incremented by ΔAFL. After the completion of the processing of step S302, the process proceeds to step S111.

As described above, when the catalyst deterioration determination control shown in FIG. 10 is performed, while the air-fuel ratio of the exhaust gas flowing into the three-way catalyst 7 is gradually increased in the lean shift mode in the active air-fuel ratio control, the air-fuel ratio of the exhaust gas flowing into the three-way catalyst 7 abruptly changes in a step manner in the rich shift mode, as shown in graph (a) in FIG. 11. Thus, in the active air-fuel ratio control, the air-fuel ratio of the exhaust gas flowing into the three-way catalyst 7 is gradually changed only in the lean shift mode among the lean and rich shift modes. Since the oxygen concentration sensor 9 has the above-described overly rich output characteristics, its response speed to the exhaust gas having a rich air-fuel ratio is higher than its response speed to the exhaust gas having a lean air-fuel ratio. Since the air-fuel ratio of the exhaust gas flowing into the three-way catalyst 7 is gradually increased in the lean shift mode, a sufficiently rich air-fuel ratio state is achieved in the interior of the three-way catalyst 7 as shown in graph (c) in FIG. 11, though the air-fuel ratio of the exhaust gas flowing into the three-way catalyst 7 is changed in a step manner in the rich shift mode. Therefore, while enabling calculation of the OSC of the three-way catalyst 7 with some degree of accuracy by the gradually increasing the air-fuel ratio, it is possible to improve emission control of the internal combustion engine 1, for example, to control increases in harmful emissions (in particular, to reduce NOx), to control the progress of S-poisoning of the three-way catalyst 7, or to remove S-poisoning of the three-way catalyst 7.

Embodiment 4

Figure 12:
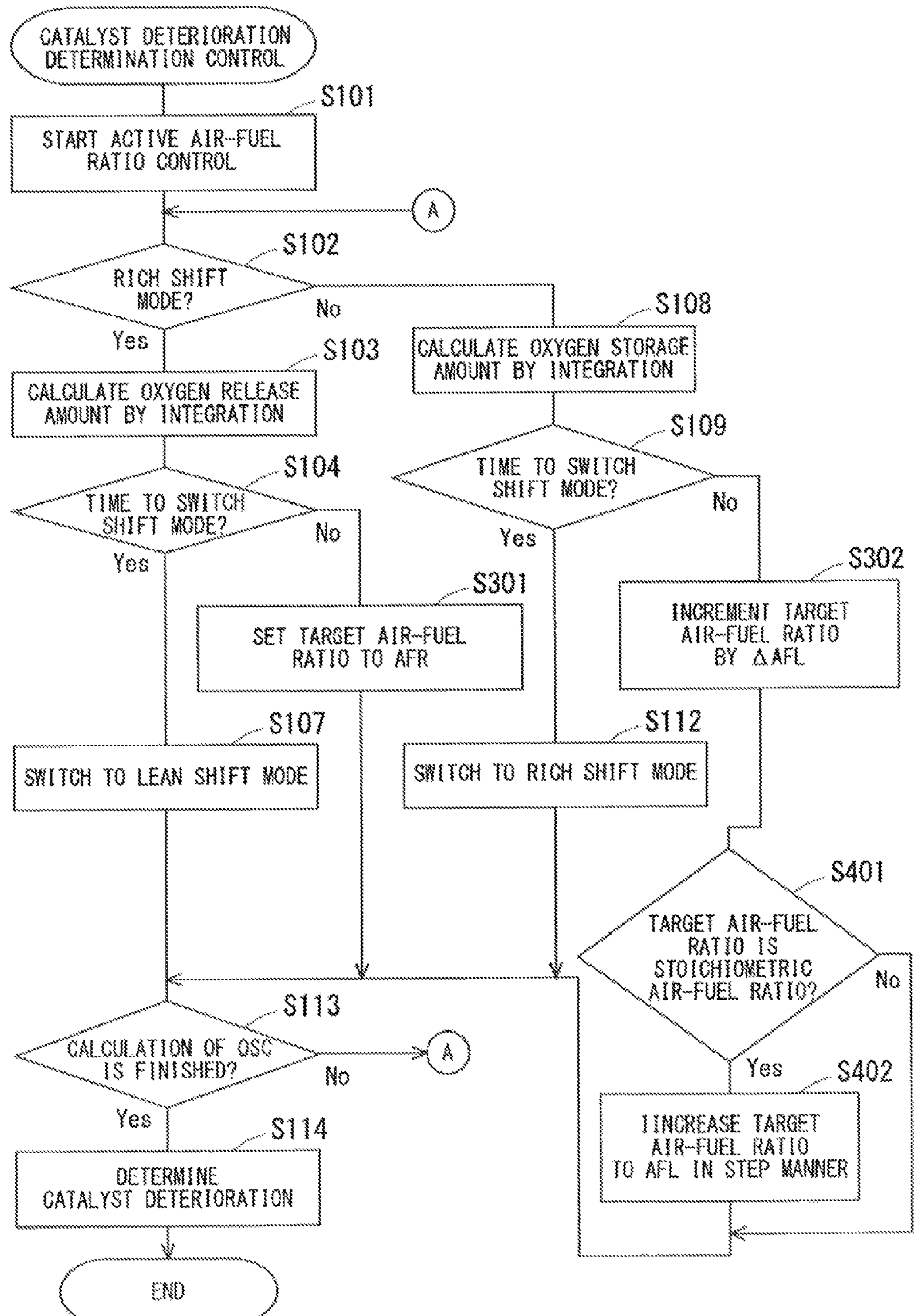
FIG. 12 is a flow chart of a catalyst deterioration determination control according to a fourth embodiment of the present invention.

A fourth embodiment of the present invention will be described with reference to FIG. 12. FIG. 12 is a flow chart of a catalyst deterioration determination control according to the fourth embodiment. The processing steps the same as those in the catalyst deterioration determination control shown in FIGS. 7 and 10 are denoted by the same reference numerals and will not be described in detail. In the catalyst deterioration determination control shown in FIG. 12, the processing of step S111 in the catalyst deterioration determination control shown in FIG. 10 is replaced by the processing of steps S401 and S402.

Specifically, after the completion of the processing of step S302, the process proceeds to step S401. In step S401, it is determined whether the target air-fuel ratio, which is a command issued by the ECU 20 to the fuel injection valve 6 for the active air-fuel ratio control and has been increased by the processing of step S302, reaches the stoichiometric air-fuel ratio. If the determination made in step S401 is affirmative, the process proceeds to step S402. In step S402, the target air-fuel ratio is increased in a step manner to a predetermined lean air-fuel ratio AFL as a target value to be reached in the lean shift mode. After the completion of the processing in step S402, the process proceeds to step S113. On the other hand, if the determination made in step S401 is negative, the processing of step S402 is skipped, and the process proceeds to step S113.

As described above, when the catalyst deterioration determination control shown in FIG. 11 is performed, while in the rich shift mode of the active air-fuel ratio control, the target air-fuel ratio is set to the predetermined rich air-fuel ratio AFR in a step manner from the outset, in the lean shift mode, the target air-fuel ratio is gradually increased by ΔAFL as it changes from a rich air-fuel ratio to the stoichiometric air-fuel ratio, and after it reaches the stoichiometric air-fuel ratio, it is increased to a predetermined lean air-fuel ratio AFL in a step manner. Thus, in the lean shift mode, the target air-fuel ratio is increased quickly in a range from the stoichiometric air fuel ratio to the lean air-fuel ratio. In consequence, with the catalyst deterioration determination control shown in FIG. 12, it is possible to calculate the OSC of the three-way catalyst 7 accurately and to improve emission control of the internal combustion engine 1 like in the third embodiment. Furthermore, it is possible to further reduce the generation of NOx, because the time over which the exhaust gas air-fuel ratio is lean can be shortened.

Embodiment 5

Figure 13:
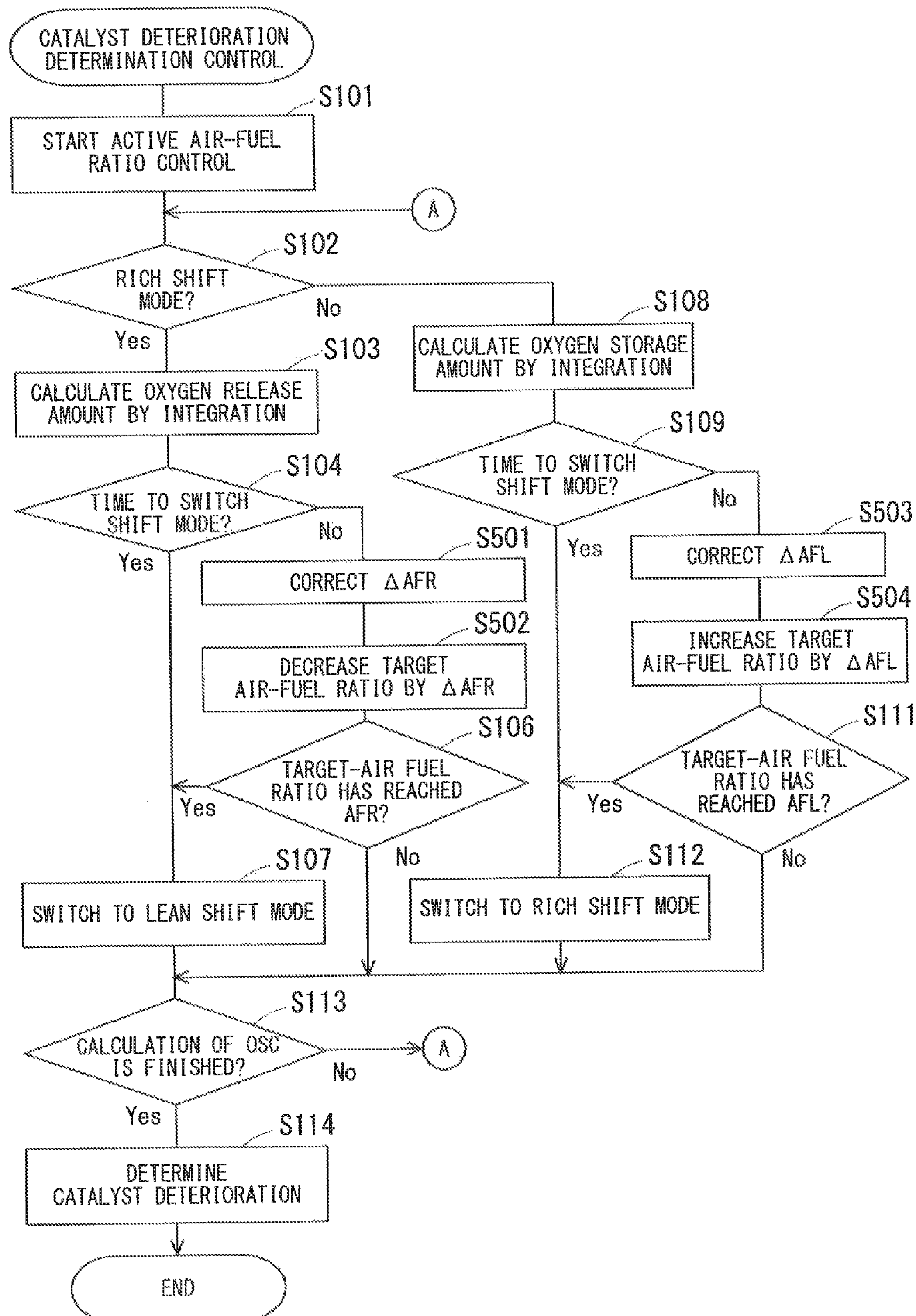
FIG. 13 is a flow chart of a catalyst deterioration determination control according to a fifth embodiment of the present invention.

A fifth embodiment of the present invention will be described with reference to FIG. 13. FIG. 13 is a flow chart of a catalyst deterioration determination control according to the fifth embodiment. The processing steps the same as those in the catalyst deterioration determination control shown in FIG. 7 are denoted by the same reference numerals and will not be described in detail. In the catalyst deterioration determination control shown in FIG. 13, the processing of steps S105 in the catalyst deterioration determination control shown in FIG. 7 is replaced by the processing of steps S501 and S502, and the processing of step S110 in the catalyst deterioration determination control shown in FIG. 7 is replaced by the processing of steps S503 and S504.

Specifically, in the rich shift mode, if the determination made in step S104 is negative, the process proceeds to step S501. In step S501, the gradual decrease amount ΔAFR of the target air-fuel ratio to be used in the later described step S502 is corrected. Then, the process proceeds to step S502, where the target air-fuel ratio, which is a command issued by the ECU 20 to the fuel injection valve 6 for the active air-fuel ratio control, is decremented by ΔAFR. After the completion of the processing of step S502, the process proceeds to step S106. In the lean shift mode, if the determination made in step S109 is negative, the process proceeds to step S503. In step S503, the gradual increase amount ΔAFL of the target air-fuel ratio to be used in the later described step S504 is corrected. Then, the process proceeds to step S504, where the target air-fuel ratio, which is a command issued by the ECU 20 to the fuel injection valve 6 for the active air-fuel ratio control, is incremented by ΔAFL. After the completion of the processing of step S504, the process proceeds to step S111.

Figure 14:
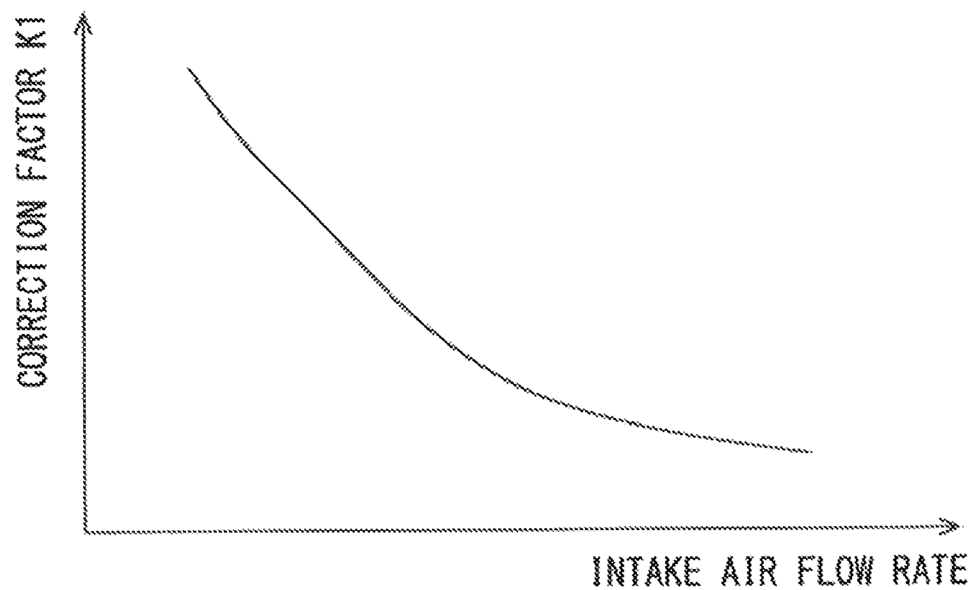
FIG. 14 shows relationship between correction factors for correction processing performed in the catalyst deterioration determination control shown in FIG. 13 with the intake air flow rate of the internal combustion engine and the temperature of the oxygen concentration sensor.
Figure 14:
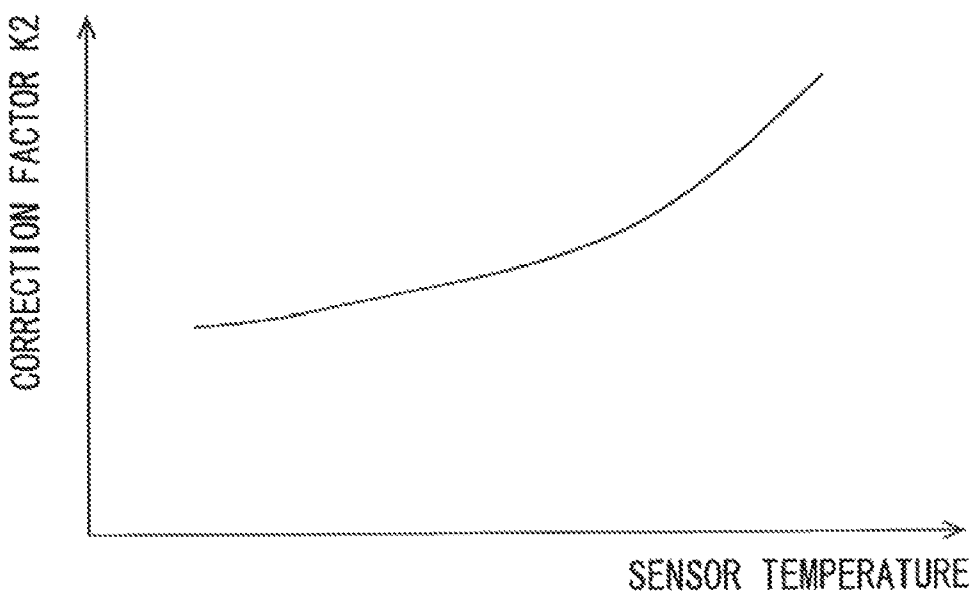

As described above, in this embodiment, processing of correcting the values of ΔAFR and ΔAFL by which the target air-fuel ratio is gradually decreased or increased is executed in steps S501 and S503. The correction processing in step S501 and that in S503 are substantially the same processing, they will be described together with reference to FIG. 14. The upper graph (a) in FIG. 14 shows a relationship between the intake air flow rate of the internal combustion engine 1, which correlates with the flow rate of the exhaust gas flowing into the three-way catalyst 7, and the correction factor K1. The correction factor K1 is a factor by which ΔAFR and ΔAFL before correction are multiplied to calculate corrected ΔAFR and ΔAFL. When the flow rate of the exhaust gas flowing into the three-way catalyst 7 is high, it is preferred that a longer reaction time be provided so that the reaction of storing/releasing oxygen in the three-way catalyst 7 progresses with higher reliability. Therefore, the correction factor K1 is decreased as the intake air flow rate measured by the air flow meter 4 increases. Consequently, gradual decrease and gradual increase of the target air-fuel ratio are performed more slowly.

The lower graph (b) in FIG. 14 shows a relationship between the temperature of the oxygen concentration sensor 9 and a correction factor K2. The correction factor K2 is a factor by which ΔAFR and ΔAFL before correction are multiplied to calculate corrected ΔAFR and ΔAFL. The higher the temperature of the oxygen concentration sensor 9 is, the higher the response of the oxygen concentration sensor 9 to the rich gas components and the lean gas components is. Therefore, the correction factor K2 is increased, as the temperature of the oxygen concentration sensor 9 rises. In consequence, gradual decrease and gradual increase of the target air-fuel ratio are performed more quickly.

As described above, when the catalyst deterioration determination control shown in FIG. 13 is performed, the air-fuel ratio of the exhaust gas flowing into the three-way catalyst 7 is gradually decreased/increased by the active air-fuel ratio control, as with in the catalyst deterioration determination control shown in FIG. 7. This helps accurate calculation of the OSC of the three-way catalyst 7. Moreover, as the magnitude of the gradual decrease and gradual increase of the exhaust gas air-fuel ratio are corrected based on the intake air flow rate and/or the temperature of the oxygen concentration sensor 9, the rate of change of the exhaust gas air-fuel ratio in the active air-fuel ratio control is made more appropriate, and it is possible to prevent a decrease in the accuracy in calculating the OSC of the three-way catalyst 7 due to excessively high rate of change and to prevent a prolongation of the time taken to calculate the OSC of the three-way catalyst 7 due to excessively low rate of change. In particular, the prevention of a prolongation of time taken to calculate the OSC of the three-way catalyst 7 by the embodiment is practically beneficial, because the active air-fuel ratio control performed for calculating the OSC positively changes the exhaust gas air-fuel ratio to deviate it from the neighborhood of the stoichiometry, in which the exhaust gas can be purified in the three-way catalyst 7 intrinsically efficiently.

DESCRIPTION OF THE REFERENCE SIGNS

1: internal combustion engine
2: intake passage

3: exhaust passage
4: air flow meter
6: fuel injection valve
7: three-way catalyst
8: air-fuel ratio sensor
9: oxygen concentration sensor
20: ECU

The invention claimed is:

1. A catalyst deterioration determination system for determining deterioration of an exhaust gas purification catalyst configured to store oxygen provided in an exhaust passage of an internal combustion engine, comprising:

an oxygen concentration sensor that measures the oxygen concentration in exhaust gas flowing out of said exhaust gas purification catalyst and has specific measuring characteristics by which as a rich gas component in exhaust gas increases, said oxygen concentration sensor outputs a measurement value of the oxygen concentration corresponding to a richer air-fuel ratio; and an electronic control unit configured to control the air-fuel ratio of exhaust gas flowing into said exhaust gas purification catalyst, switch between a rich shift mode in which the exhaust gas air-fuel ratio is shifted from a lean air-fuel ratio to a rich air-fuel ratio and a lean shift mode in which the exhaust gas air-fuel ratio is shifted from a rich air-fuel ratio to a lean air-fuel ratio, based on the oxygen concentration in the exhaust gas measured by the oxygen concentration sensor, the rate of change of the exhaust gas air-fuel ratio in at least the lean shift mode among the rich shift mode and the lean shift mode being limited to a predetermined rate of change or lower, and the rate of change of the exhaust gas air-fuel ratio in the rich shift mode being set higher than the rate of change of the exhaust gas air-fuel ratio in the lean shift mode, and determine deterioration of said exhaust gas purification catalyst based on the oxygen storage capacity of said exhaust gas purification catalyst during a time in which said rich shift mode is performed and the oxygen storage capacity of said exhaust gas purification catalyst during a time in which said lean shift mode is performed.

2. A catalyst deterioration determination system according to claim 1, wherein the electronic control unit controls the exhaust gas air-fuel ratio in such a way that the rate of change of said exhaust gas air-fuel ratio is limited to said predetermined rate of change or lower in both of said lean shift mode and said rich shift mode.

3. A catalyst deterioration determination system according to claim 1, wherein in said lean shift mode, said electronic control unit controls the exhaust gas air-fuel ratio in such a way that the rate of change of said exhaust gas air-fuel ratio is limited to said predetermined rate of change or lower, and in said rich shift mode, said electronic control unit controls the exhaust gas air-fuel ratio in such a way as to make said exhaust gas air-fuel ratio equal to a predetermined rich air-fuel ratio as a target to be reached in said rich shift mode immediately after switching from said lean shift mode to said rich shift mode.

4. A catalyst deterioration determination system according to claim 3, wherein in a predetermine period from a time immediately after switching from said rich shift mode to said lean shift mode until said exhaust gas air-fuel ratio reaches an air fuel ratio near the stoichiometry in a period in which said lean shift mode is performed, said electronic control unit controls the exhaust gas air-fuel ratio in such a way that the rate of change of said exhaust gas air-fuel ratio is limited to said predetermined rate of change or lower, and after the end of said predetermined period in said lean shift mode, said electronic control unit controls the exhaust gas air-fuel ratio in such a way as to make said exhaust gas air-fuel ratio equal to a predetermined lean air-fuel ratio as a target to be reached in said lean shift mode immediately after the end of said predetermined period.

5. A catalyst deterioration determination system according to claim 1, wherein said predetermined rate of change is set based on the response speed of a rich gas component and a lean gas component in the exhaust gas in said oxygen concentration sensor.

6. A catalyst deterioration determination system according to claim 1, wherein the electronic control unit corrects said predetermined rate of change in such a way as to make it larger as the temperature of said oxygen concentration sensor rises.

7. A catalyst deterioration determination system according to claim 1, wherein the electronic control unit corrects said predetermined rate of change in such a way as to make it smaller as the flow rate of exhaust gas flowing into said exhaust gas purification catalyst increases.

* * * * *